US009727798B2

(12) United States Patent
Caldwell

(10) Patent No.: US 9,727,798 B2
(45) Date of Patent: Aug. 8, 2017

(54) GENERATING AND USING A PREDICTIVE VIRTUAL PERSONIFICATION

(71) Applicant: Acrovirt, LLC, Cardiff, CA (US)

(72) Inventor: James Michael Caldwell, Cardiff, CA (US)

(*) Notice: Subject to any disclaimer, the term of this patent is extended or adjusted under 35 U.S.C. 154(b) by 0 days.

(21) Appl. No.: 14/804,302

(22) Filed: Jul. 20, 2015

(65) Prior Publication Data
US 2016/0019434 A1 Jan. 21, 2016

Related U.S. Application Data

(60) Provisional application No. 62/026,568, filed on Jul. 18, 2014, provisional application No. 62/148,709, filed on Apr. 16, 2015, provisional application No. 62/148,719, filed on Apr. 16, 2015, provisional application No. 62/148,724, filed on Apr. 16, 2015.

(51) Int. Cl.
G06K 9/46 (2006.01)
G06N 5/04 (2006.01)
G06T 7/20 (2017.01)
G06K 9/00 (2006.01)
G06K 9/62 (2006.01)

(52) U.S. Cl.
CPC ....... G06K 9/4671 (2013.01); G06K 9/00342 (2013.01); A63F 2300/6607 (2013.01); G06K 9/6256 (2013.01)

(58) Field of Classification Search
USPC .................. 345/474; 382/159, 170, 171, 190
See application file for complete search history.

(56) References Cited

U.S. PATENT DOCUMENTS

| 8,369,652 B1* | 2/2013 | Khosla ................. G06K 9/3241 382/284 |
| 2007/0067273 A1 | 3/2007 | Willcock |
| 2008/0275830 A1 | 11/2008 | Greig |
| 2009/0285456 A1 | 11/2009 | Moon et al. |
| 2012/0056800 A1* | 3/2012 | Williams ................ G06F 3/011 345/156 |
| 2012/0072121 A1 | 3/2012 | Mollicone et al. |
| 2013/0156320 A1* | 6/2013 | Fredembach ............ G06K 9/46 382/190 |

(Continued)

OTHER PUBLICATIONS

Patent Cooperation Treaty, International Search Report for PCT/US2015/041211, Oct. 23, 2015, pp. 1-2.

Primary Examiner — Kimberly A Williams
(74) Attorney, Agent, or Firm — Sheppard Mullin Richter & Hampton LLP

(57) ABSTRACT

A system for generating a predictive virtual personification includes receiving, from an AV data source, a data store, and a saliency recognition engine, wherein the AV data source is configured to transmit one or more AV data sets to the saliency recognition engine, each AV data set includes a graphical representation of a donor subject, and the saliency recognition engine is configured to receive the AV data set and one or more identified trigger stimulus events, locate a set of saliency regions of interest (SROI) within the graphical representation of the donor subject, generate a set of SROI specific saliency maps and store, in the data store, a set of correlated SROI specific saliency maps generated by correlating each SROI specific saliency map a corresponding trigger event.

19 Claims, 13 Drawing Sheets

(56) References Cited

U.S. PATENT DOCUMENTS

| | | | |
|---|---|---|---|
| 2015/0227817 A1* | 8/2015 | Lin | G06K 9/6212 382/170 |
| 2015/0262039 A1* | 9/2015 | Ruan | G06K 9/3233 382/159 |
| 2015/0373306 A1* | 12/2015 | Flores | H04N 5/77 348/157 |
| 2016/0225177 A1* | 8/2016 | Autier | G11B 27/031 |

* cited by examiner

GENERATING AND USING A PREDICTIVE VIRTUAL PERSONIFICATION

CROSS-REFERENCE TO RELATED APPLICATIONS

This application claims the benefit of and priority to U.S. Provisional Patent Application Ser. No. 62/026,568 filed on Jul. 18, 2014, U.S. Provisional Patent Application Ser. No. 62/148,709 filed on Apr. 16, 2015, U.S. Provisional Patent Application Ser. No. 62/148,719 filed on Apr. 16, 2015, and U.S. Provisional Patent Application Ser. No. 62/148,724 filed on Apr. 16, 2015, the contents of each of which are incorporate herein by reference.

TECHNICAL FIELD

The disclosed technology relates generally to applications for cognitive analysis, and more particularly, some embodiments relate to systems and methods for predictive virtual personification using cognitive and geospatial signal analysis.

BACKGROUND

With improvements in imaging and computer processing power, computer generated representations of human subjects have become more common, particularly in the film and video game industries. While realistic computer generated representations/characters have become increasingly more realistic, currently available technologies still require real-time interaction or scenario-specific planning to enable the character to interact within a particular virtual environment. Accordingly, a computer generation of a real-life person is only as realistic to the extent that a programmer pre-determined the character's response to any particular stimulus.

The psychological and anatomical movement characteristics of the real-life subject must be manually and painstakingly programmed into the character's computer program. Alternatively, the real-life subject may wear special suits and, using motion capture technology (MOCAP), a computer can capture the anatomical movements and responses to specific stimuli, but again, the interaction of the virtual character with the virtual environment is manually manufactured. If the real-life subject did not perform a specific task or reaction, then the character is not capable of performing the task or reaction either.

Moreover, existing computer generated character technology is not capable of incorporating cognitive behavior from the real-life subject into the character. Cognitive behavior, for purposes of this disclosure, means the level of learning and/or awareness a subject may have to any specific stimulus. As cognitive learning increases, a subject's reaction to the same stimulus will become more repeatable and more predictable. Alternatively, when cognitive learning is low, a subject's response to a particular stimulus is more sporadic. This concept is true for large scale reaction to stimuli, such as reacting to a baseball being pitched in a subject's direction, as well as small scale reactions such as facial expressions and anatomical movement characteristics. While technology exists to functionally image the human brain and determine when certain neural pathways are active in response to specific stimuli, available technology has been incapable of incorporating functional imaging techniques to create a more cognitively aware computer generated representation of a subject. Thus, currently available virtual personification technology is incapable of adequately incorporating a subject's cognitive capabilities with realistic anatomical features and movements.

BRIEF SUMMARY OF EMBODIMENTS

According to various embodiments of the disclosed technology, a method for generating a predictive virtual personification using cognitive and geospatial signal analysis. A predictive virtual personification may be, for example, a graphically rendered, holographic, robotic, mechanical doppelganger, or other representative form that both looks and behaves like a donor subject (e.g. a human) when exposed to the same stimulus. For example, data may be collected from observations made of the donor subject performing particular tasks and reacting to particular stimuli. The data may be processed by a predictive rendering engine to output a predictive virtual personification that, when exposed to either the same stimuli as the donor subject or a completely new stimuli, reacts in a way that realistically emulates the donor.

In one embodiment, a method for generating a predictive virtual personification includes capturing a static geospatial imaging baseline, capturing a static neuro-cognitive imaging baseline, correlating the baseline image data with historical data, and simultaneously capturing dynamic geospatial and neuro-cognitive imaging while a subject performs an activity. For example, static geospatial imaging modalities may include optical imaging, magnetic resonance imaging (MRI), computer tomography imaging (CT), X-Ray, or other geospatial imaging techniques known in the art. "Static" imaging means that the subject being imaged is stationary, whereas "dynamic" imaging means the subject is moving. Static neuro-cognitive imaging modalities may include Functional MRI (fMRI), functional Positron Emission Tomography (PET), Magnetoencephalography (MEG), Electroencephalography (EEG), or other functional brain imaging as known in the art. Dynamic geospatial imaging modalities may include optical imaging, and dynamic neuro-cognitive imaging modalities may include MEG and EEG.

Some embodiments may also include calculating and storing stimulus specific cognitive plasticity factors and graphically rendering a virtual personification from geospatial data. For example, cognitive plasticity factors may quantitatively depict the level of cognitive learning that has occurred with respect to a subject's reaction to a specific stimulus. For purposes of defining a cognitive plasticity factor, a particular subject's physical reaction to a particular stimulus is presumed to be a manifestation of the activation of a particular set of neurons in that subject's brain, known as a neural pathway. The aforementioned neuro-cognitive imaging may detect the neural pathway activation, while the geospatial imaging may detect the physical manifestation of the neural pathway activation. A subject's first few reactions to repeated exposures to the same stimulus likely will result in the activation of varying neural pathways as correlated with slightly different physical reactions—measured as a high cognitive plasticity factor. However, over time, a single neural pathway will activate repeatedly to the same stimulus as correlated with the same subject-unique physical reaction—measured as a low cognitive plasticity factor. Being a reaction to a particular stimulus. Thus, cognitive learning (and repeatability of a particular physical reaction to the same known stimulus) will increase as an inverse relationship to the cognitive plasticity factor as defined herein.

In some examples, graphical rendering of a virtual personification from geospatial data is accomplished using available data compiled from three dimensional geospatial imaging and then extrapolated using known humanoid standards or canons to predictively render specific physical reactions to stimuli. In some embodiments, the cognitive plasticity factor may be incorporated in a predictive graphical rendering algorithm to determine, probabilistically, a specific subject's reaction to a particular stimuli based on the subject's cognitive plasticity with respect to that specific stimuli. Thus, an example method for generating a predictive virtual personification may also include selecting a stimulus and applying the stimulus specific cognitive plasticity factor to the predictive graphical rendering algorithm.

In other embodiments, a method for training a neural pathway may include capturing a static geospatial imaging baseline, capturing a static neuro-cognitive imaging baseline, correlating the baseline imaging to historical data, and simultaneously capturing dynamic geospatial and neuro-cognitive imaging while a subject performs an activity. An example method may also include repeating the static neuro-cognitive imaging while the subject visualizes performing the same activity to measure the subject's cognitive plasticity factor—the subject's cognitive plasticity factor will reduce inversely to the level of cognitive learning that has occurred, until a threshold level is reached indicating that the subject has learned the particular task sufficiently.

Some examples include a system for generating a predictive virtual personification using cognitive and geospatial signal analysis. The system may include one or more static geospatial imaging devices, one or more static neuro-cognitive imaging devices, one or more dynamic geospatial imaging devices, one or more dynamic cognitive imaging devices, and a correlation engine, wherein all of the imaging devices are configured to transmit image data to the correlation engine, and the correlation engine is configured to calculate a stimulus specific cognitive plasticity factor. An example system may also include a correlation database, historical data feed, and data store, wherein the correlation database may be configured to receive and correlate historical data from the historical data feed and imaging data from the imaging devices and store results in the data store. An example system may also include a predictive rendering engine and a 3D rendering engine, wherein the 3D rendering engine is configured to receives imaging data and historical data and render 3D images of a subject, and the predictive rendering engine is configured to receive 3D renderings, correlation data, and cognitive plasticity factors, calculate a probabilistic 3D rendering of a subject responding to a specific stimulus.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
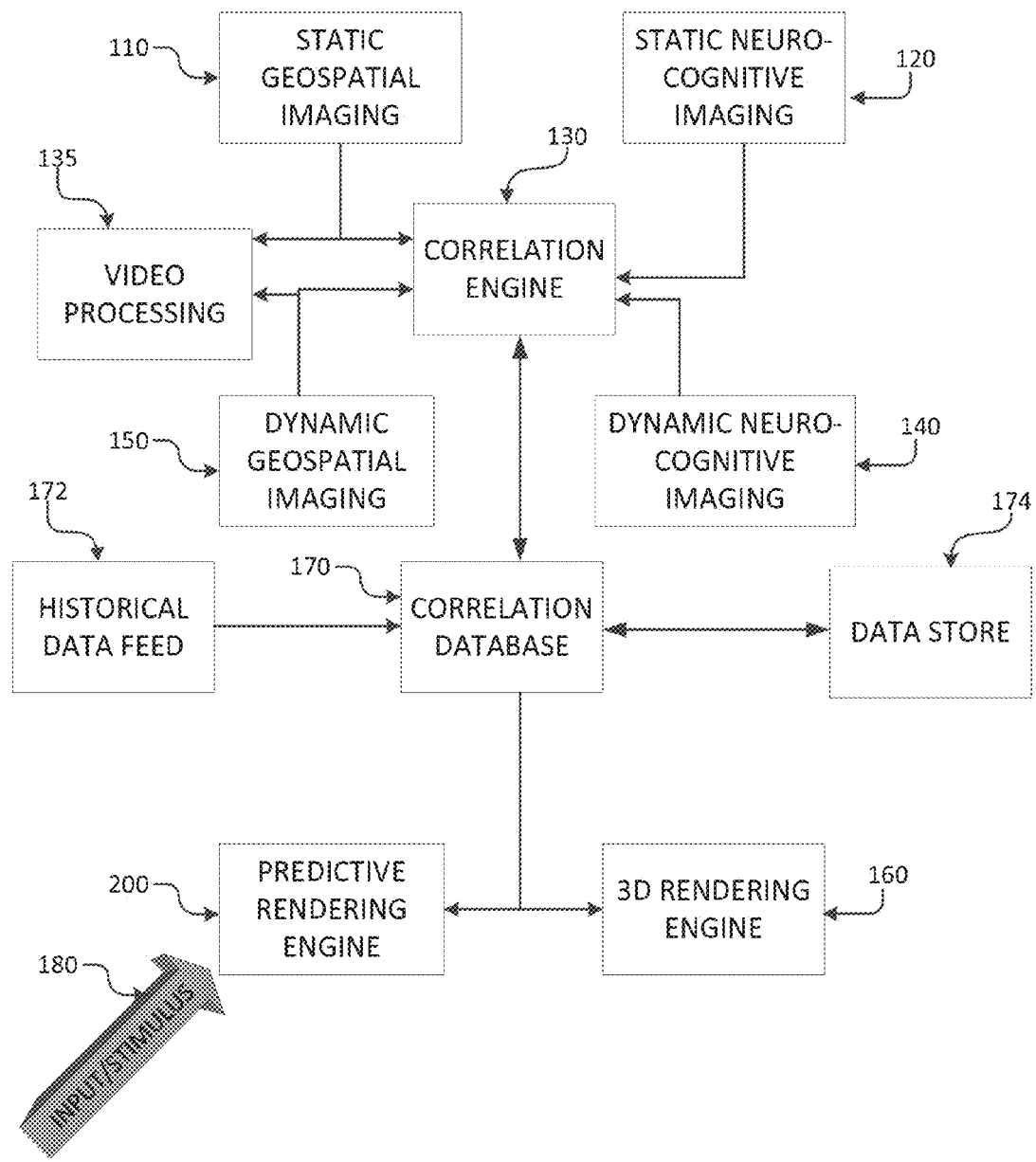
FIG. 1 illustrates an example system for generating a predictive virtual personification using cognitive and geospatial signal analysis that may be used in implementing various features of embodiments of the disclosed technology.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The technology disclosed herein is directed toward a system and method for generating a predictive virtual personification using geospatial and neuro-cognitive signal analysis. Some embodiments of the disclosure provide a method for training a neural pathway. An example method of training a neural pathway may include capturing, with a geospatial imaging modality, one or more geospatial imaging data sets, capturing, with a neuro-cognitive imaging modality, one or more neuro-cognitive imaging data sets, and applying a stimulus. The method may further include calculating, with a computer processor, a stimulus specific cognitive plasticity factor (CPF) and re-applying the stimulus until the CPF exceeds a threshold level. If the CPF exceeds the pre-determined threshold, then a the subject has effectively learned a response to the stimulus. This learning mechanism provides the subject, and the subject's trainers, with real-time feedback indicating how well the subject is learning a desired stimulus response.

In some embodiments, a method for generating a predictive virtual personification (PVP) includes receiving, from an AV data source, an AV data set and locating within the AV data set, with a saliency recognition engine, a graphical representation of a donor subject and a set of saliency regions of interest (SROI) within the graphical representation of the donor subject. For example, an SROI may be a particular observable feature on a donor subject, such as an eye brow, a mouth, an arm, a hand, etc., and the method includes observing that feature over time and tracking movements in correlation to a trigger stimulus event, as well as the movements of other SROIs of the same donor subject at the same times.

The method may also include identifying one or more trigger stimulus events, wherein each trigger stimulus events precedes or is contemporaneous with one or more SROI specific reactive responses and each SROI specific reactive response is observable within a SROI. For example, the trigger stimulus event may be an oncoming baseball pitch, a change in lighting, a question posed by another subject/person, or an internal decision of the donor subject to do something. The SROI specific reactive responses are movement maps (e.g., SROI-specific saliency maps) that track changes in geospatial orientation over time for each SROI.

The method may also include generating, for each SROI, a set of SROI specific saliency maps, wherein each SROI specific saliency map plots a change in geospatial orientation of one or more SROIs within a predetermined timeframe corresponding to each trigger stimulus event, and storing, in a data store, a set of correlated SROI specific saliency maps generated by correlating each SROI specific saliency map a corresponding trigger event.

Some examples of the method include identifying a set of donor-specific physio-emotional characteristics corresponding to a donor-specific physio-emotional state at the time of the trigger stimulus event and tagging the set of correlated SROI specific saliency maps with the corresponding set of donor-specific physio-emotional characteristics. For example, the donor-specific physio-emotional characteristics may include a donor subject's mood (e.g., happy, sad, angry, etc.), as well as other factors such as stress level, level of rest, health, performance, etc. In some examples, the donor-specific physio-emotional characteristics may be manually entered by a user into a user input device, such as a computer terminal, mobile phone, laptop, or other user input device with a user interface sufficient to enable data input. In other examples, the set of donor-specific physio-emotional characteristics may be automatically matched to the SROI specific saliency maps (i.e., the captured data set) using a predictive virtual personification (PVP) correlation engine programmed onto a PVP server. For example, one or more correlated SROI specific saliency maps may be matched/correlated with a plurality of historical SROI specific saliency maps, wherein each historical SROI specific saliency map corresponds to a set of known physio-emotional characteristics. In some examples, the matching of the one or more correlated SROI specific saliency maps with a plurality of historical SROI specific saliency maps may be performed by applying a renormalization group transformation to each historical specific saliency map to generate a predictive saliency map space.

In some embodiments, the method may also include generating, with a graphical rendering engine, an animated representation of the donor subject using the AV data set. The method may further include exposing the animated representation of the donor subject to a secondary stimulus event and rendering for each SROI, with a PVP rendering engine, a predicted reactive response. For example, a previously applied trigger stimulus event, or completely new stimulus event may be introduced (e.g., throwing the representation of the donor subject a football, when previous trigger stimulus events included throwing a baseball and a basketball), and a predicted active response, as applied to each SROI, may be calculated. For example, the method may include identifying a secondary set of physio-emotional characteristics corresponding to the animated representation of the donor subject (e.g., predicting or identifying the representation of the donor subject's mood, stress level, rest level, health, etc.), and identifying one or more trigger stimulus events corresponding to the secondary stimulus event (i.e., throwing football is similar to throwing a baseball or basketball). The method may further include receiving, from the data store, each set of correlated SROI specific saliency maps corresponding to each identified trigger stimulus event and to the identified set of physio-emotional characteristics and generating, with the PVP rendering engine, a set of predictive SROI-specific saliency maps based on a probabilistic extrapolation as a function of the correlated SROI specific saliency maps, the identified physio-emotional characteristics, and the identified trigger stimulus event.

Some examples of the method include generating a set of predictive SROI-specific saliency maps by collecting the correlated SROI specific saliency maps into a historical saliency map space and applying a renormalization group transformation to the historical saliency map space to generate a predictive saliency map space.

The method may further include rendering, with the graphical rendering engine, a geospatial movement of the animated representation of the donor subject by applying the set of predictive SROI-specific saliency maps to each SROI within the animated representation of the donor subject.

In other embodiments of the disclosure, a system for generating a predictive virtual personification includes an AV source, a data store, and a saliency recognition engine. For example, the AV source may be a historical archive comprising subsequently captured film, video, or audio data, a video camera, a television camera, a high frame rate video camera, a high resolution video camera, a motion capture device (MOCAP), a functional imaging modality, or other AV data sources as known in the art. The AV data source may be configured to transmit one or more AV data sets to the saliency recognition engine, wherein each AV data set includes a representation of a donor subject. The saliency recognition engine may include a non-volatile computer readable media with a computer program stored thereon, the computer program configured to receive the AV data set and one or more identified trigger stimulus events, wherein each identified trigger stimulus events precedes or is contemporaneous with one or more SROI specific reactive responses and each SROI specific reactive response is observable within an SROI. The saliency recognition engine may be further configured to locate a set of saliency regions of interest (SROI) within the graphical representation of the donor subject and generate, for each SROI, a set of SROI specific saliency maps. For example, each SROI specific saliency map may plot a change in geospatial orientation of one or more SROIs within a predetermined time-frame corresponding to each trigger stimulus event. The saliency recognition engine may be further configured to store, in the data store, a set of correlated SROI specific saliency maps generated by correlating each SROI specific saliency map a corresponding trigger event.

In some examples, saliency recognition engine is further configured to identify a set of donor-specific physio-emotional characteristics corresponding to a donor-specific physio-emotional state at the time of the trigger stimulus event and tag the set of correlated SROI specific saliency maps with the corresponding set of donor-specific physio-emotional characteristics. The system may also include a graphical rendering engine configured to generate an animated representation of the donor subject based on the AV data set. The system may also include a PVP rendering engine configured to generate a predicted reactive response to a secondary stimulus event.

In some examples, the PVP rendering engine is further configured to identify a secondary set of physio-emotional characteristics corresponding to the animated representation of the donor subject and identify one or more trigger stimulus events corresponding to the secondary stimulus event, receive each set of correlated SROI specific saliency maps that correspond to each identified trigger stimulus event and to the identified set of physio-emotional characteristics and generate a set of predictive SROI-specific saliency maps based on a probabilistic extrapolation as a function of the correlated SROI specific saliency maps, the identified physio-emotional characteristics, and the identified trigger stimulus event.

In some embodiments, the graphical rendering engine configured to render geospatial movement of the animated representation of the donor subject by applying the set of predictive SROI-specific saliency maps to each SROI within the animated representation of the donor subject. Some examples of the system include an AV output device (e.g., a video or movie projector, a display, a holographic projector, etc.) configured to project the animated representation of the donor subject into a geospatial environment. The geospatial environment may be rendered or real.

Other embodiments of the disclosure provide a system for training a neural pathway. The system may include an environmental isolation device, one or more optical imaging modalities, and one or more neuro-cognitive imaging modalities. Each optical imaging modality may optically couple to the environmental isolation device and may be configured to capture an optical image data set of a subject located within the environmental isolation device and transmit optical imaging data set to the correlation engine. Each neuro-cognitive imaging modality may be configured to capture a functional imaging data set of a brain, identify, within the functional imaging data set, any active neural pathways, and transmit the functional imaging data set to the correlation engine. The correlation engine may be configured to correlate the optical imaging data set with the functional imaging data set and to calculate a stimulus specific CPF.

Other embodiments of the disclosure provide a method for generating a predictive virtual personification. The method may include capturing, with a geospatial imaging modality, one or more geospatial imaging data sets, capturing, with a neuro-cognitive imaging modality, one or more neuro-cognitive imaging data sets, and applying a stimulus. The method may also include calculating, with a computer processor, a stimulus specific CPF, graphically rendering, with a rendering engine, a three dimensional virtual personification, and correlating, with a correlation engine, the stimulus specific CPF with the three dimensional virtual personification.

FIG. 1 illustrates an example system for generating a predictive virtual personification using cognitive and geospatial signal analysis that may be used in implementing various features of embodiments of the disclosed technology. Referring now to FIG. 1, a system for generating a predictive virtual personification may include one or more static geospatial imaging modalities 110. For example, static geospatial imaging modality 110 is configured to capture images of stationary subject. Static geospatial imaging modality 110 may be either an internal imaging modality to capture internal anatomy, such as an X-Ray, CT Scanner, MRI, Ultrasound, or other imaging modality designed to capture images of a subject's internal anatomy. Alternatively, or in combination with an internal imaging device, static geospatial imaging device 110 may be an external imaging device to capture images of a subject's external anatomy such as optical imaging cameras or laser scanners, or other imaging modalities designed to capture images of a subject's external anatomy.

Still referring to FIG. 1, the system for generating a predictive virtual personification may also include one or more static neuro-cognitive imaging modalities 120. For example, static neuro-cognitive imaging modality 120 may be either a neuro-functional imaging modality, a cognitive imaging modality, or a combination of both. A neuro-functional imaging modality is designed to detect activation of neurons and/or neural pathways in the brain through the detection of electro-magnetic fields that are generated when neurons activate (e.g. by using an EEG or MEG device), or through the detection of increased blood flow to specific regions of the brain surrounding activated neurons that tend to draw in more oxygen (e.g., detection of a Blood Oxygen Level Dependent signal or BOLD with fMRI), or through diffusion tensor imaging (DTI).

A cognitive imaging modality may incorporate one or more of the neuro-functional imaging modalities, but uses historical correlation to track variance in neural pathway activation as correlated with the performance (or a subject's imagining of performance) of a specific task. The cognitive imaging modality may then calculate a cognitive plasticity factor (CPF) associated with the particular task, or stimulus 180, that represents the level of predictability of a subject's neural response to that task or stimulus. For example, a low CPF indicates a high level of neural pathway variance in response to repeated exposures to the same stimulus (e.g. if a subject with a low CPF to a startling event would react differently to repeated exposure to the same startling event, and different neural pathways would activate upon each exposure). Alternatively, a high CPF indicates a low level of neural pathway variance in response to repeated exposures to the same stimulus, meaning that upon each exposure to the same stimulus, the same neural pathway will activate, as manifested by the same physical response to the stimulus.

Still referring to FIG. 1, the system for generating a predictive virtual personification may also include one or more dynamic geospatial imaging modalities 150. For example, dynamic geospatial imaging modalities 150 may include optical imaging devices such as digital video cameras. An example digital video camera might be a highframe-rate camera (e.g. some high frame rate cameras are capable of capturing upwards of 18,000 frames per second and are capable of time mapping, warping, high dynamic rate to low dynamic rate conversion, and/or tone mapping). In some examples, geospatial imaging modalities 110 and 150 may interact with a video processing module 135 configured to execute a video extrapolation and rendering algorithm that may predictively calculate and interleave missing video pixel data in order to render a complete virtual image of a particular subject. For example, the high frame rate camera may capture partial imaging data depicting a subject performing a specific activity, and the video processing module 135 may extrapolate the partial data to complete a fully rendered image of the subject.

Alternatively, the video processing module 135 may extrapolate missing interleaved frames to convert low frame rate video data to high frame rate video data. For example, both static geospatial imaging modality 110 and dynamic geospatial imaging modality 150 may be a mobile phone or tablet camera, or any other consumer camera device capable of capturing still and video images and uploading the images via wireless communications standards, or via the Internet, to video processing module 135 for processing.

In other embodiments, dynamic geospatial imaging device 150 may include a motion capture device (MOCAP). For example, MOCAP technology may involve placing one or more acoustic, inertial, light emitting diode (LED), magnetic, or reflective markers on one or more attachment points on a subject, and then using a detector paired with the particular marker, in combination with digital video, to precisely capture the three-dimensional location of each marker and attachment point. The data may then be processed using video processing module 135 to generate a three dimensional rendering of the subject that dynamically changes over time in correlation to the subject's actual movements. Other forms of geospatial image capture may be used as are known in the art.

Still referring to FIG. 1, the system for generating a predictive virtual personification may also include one or more dynamic neuro-cognitive imaging modalities 140. Example dynamic neuro-cognitive imaging modalities 140 may include MEG or EEG devices. For example, an MEG device is configured to be worn on a subject's head and detect changes in magnetic fields emanating from a particular region of the subject's brain when electric signals travel down specific neural pathways. The signals may then be processed by video processing module 135 to calculate a three dimensional map of neural pathway activation. Similarly, an EEG device is also configured to be worn on a user's head and detect changes in electrical fields emanating from a particular region of the subject's brain. Either EEG or MEG results may show specific areas of interest containing neural pathway activation. In other examples, other direct and/or indirect neural-cognitive imaging devices may be used as would be known in the art. For example, eye-tracking devices that capture images of a subject's eyes as that subject performs specific activities to determine the level of focus on the activity, and repeatable patterns of eye movements, may be used to determine the subject's CPF with respect to that particular activity. In other words, a subject with a low CPF may exhibit more random eye movements when repeatedly performing the same activity (e.g. an inexperienced basketball free throw shooter may exhibit very random eye movement patterns when shooting free throws). In contrast, a subject with a high CPF may exhibit more repeatable and deliberate eye movements when repeatedly performing the same activity (e.g. an experienced basketball free throw shooter may exhibit the same exact pattern of eye movements, with deliberate focus on a target, when shooting free throws). Other embodiments may incorporate sensors and actuators, such as accelerometers, to collect additional data to correlate and store with the imaging data sets. For example, data from an accelerometer embedded in a mobile device may be incorporated with image data from the mobile device camera. The combined data set may be correlated and used in rendering a virtual dynamic personification (e.g. the additional sensor data may be used to supplement image data in rendering smooth, lifelike geospatial movement).

In some embodiments, the system for generating a predictive virtual personification may calculate a time-dependent CPF, or tCPF. Similar to the CPF, a tCPF is proportional to and/or a measure of the degree to which a subject learns a particular response to a particular stimulus. Whereas a standard CPF measures the degree of predictability in the subject's neuro-cognitive response (i.e. the degree of repeatability in neural pathway selection in response to the repeated exposure to the same stimulus), the tCPF is a normalized measure of the response speed to a particular stimulus. For example, a subject responding to a particular stimulus for the first time (e.g. swinging a bat in an attempt to hit an oncoming baseball) may take longer to process the response then a subject who has performed that same task multiple times. The improvement in response speed, $\Delta t$, can be measured using the neuro-cognitive imaging modalities by not only determining which neural pathway activates in response to the stimulus, but also determining how long it takes for the neural pathway to completely activate. Through repeated exposure to the same stimulus, not only may the predictability improve with respect to which neural pathway activates, but the response time between stimulus and neural pathway activation may decrease. The system for generating a predictive virtual personification may calculate the tCPF by measuring changes in neural pathway response time $\Delta t$, as visualized using neuro-cognitive imaging modalities, over repeated exposures to the same stimulus. The system may, using a computer processor, normalize these response time changes by taking $\Delta t_0$ as the response time to a first exposure to a stimulus, and $\Delta t_n$ as the response time to a the nth (i.e. the most recent) exposure to the same stimulus, and taking tCPF as the ratio in Equation 1.

$$tCPF = \frac{\Delta t_n}{\Delta t_0} \qquad (1)$$

Still referring to FIG. 1, the system for generating a predictive virtual personification may also include a correlation engine module 130. Correlation engine module 130 may accept imaging data as input from each of the static geospatial imaging modalities, each of the static neuro-cognitive imaging modalities 120, each of the dynamic geospatial imaging modalities 150, and each of the dynamic neuro-cognitive imaging modules 140, as well as video processing module 135. For example, baseline image data from static geospatial imaging modalities 110, including internal and external imaging modalities, may be merged together to form a three dimensional rendered anatomically accurate likeness of a subject. That likeness may then correlated to three dimensional neuro-cognitive image and CPF and/or tCPF baseline data from static neuro-cognitive imaging modalities 120.

In some examples, the static data may be further correlated with image data captured from dynamic geospatial imaging modalities 150 showing movement of a subject performing a specific activity or reacting to a specific stimulus (e.g. swinging a baseball bat at an oncoming pitch or swinging a golf club), and image and/or CPF/tCPF data from dynamic neuro-cognitive imaging modalities 140. The resulting data sets, including trends of CPF and/or tCPF data as correlated to specific movements of a subject's anatomy in response to specific stimuli, may be stored in a correlative database 170, and stored in data store 174. The resulting data sets may include a set of three-dimensionally rendered geospatial representations of a subject correlated over time with exposure to a stimulus and CPF and/or tCPF data. For example, the data sets stored in correlative database 170 may include a three-dimensional representation of a golfer swinging a golf club to strike a ball, including specifically the precise geospatial positioning of the golfer's hands and arms as he completes the golf swing. That data may then be correlated and stored together with CPF and/or tCPF data showing what neural pathway(s) are activated each time the golfer swings the club at the ball and/or the neural pathway activation response time. The repeatability of anatomical positioning during the swing may then be correlated with repeatable neural pathway activation and/or lowered neural pathway activation response time, resulting in a high CPF and/or low tCPF.

In some embodiments, correlation engine module 130 may generate a correlation matrix similar to that shown in Equation 2 (for time t=0) and Equation 3 (for time t=n). Equation 2 illustrates a baseline correlation function P(t=0), for a give stimulus exposure or activity at time t=0 (i.e. the image data is captured by the imaging modalities 110 and 120 to calculate a baseline state), where each geospatial coordinate $x_1$ to $x_n$ as correlated with each stimulus specific CPF and/or tCPF, $S_1$. to $S_n$.

$$P(t=0) = \begin{bmatrix} S_1 \cdot x_{1,t=0} & \cdots & S_1 \cdot x_{n,t=0} \\ \vdots & \ddots & \vdots \\ S_n \cdot x_{1,t=0} & \cdots & S_n \cdot x_{n,t=0} \end{bmatrix} \quad (2)$$

In some embodiments, because the static nature of this baseline correlation, a particular activity may be imagined (instead of physically performed). For example, the golfer may imagine swinging a golf club and striking a ball while static geospatial and neuro-cognitive image sets are captured. Repeating the process enables a comparison of which neural pathways are activated, and a calculation of the CPF and/or tCPF as a function of the neural pathway variance.

Equation 3 illustrates a dynamic correlation function P(t=n), for a given stimulus exposure or activity at time t=n (i.e. the image data is captured by the dynamic imaging modalities 140 and 150 to calculate a dynamic state), where each geospatial coordinate $x_1$ to $x_n$ as correlated with each stimulus specific CPF and/or tCPF $S_1$. to $S_n$. for all times from t=1 to t=n. In other words, each three dimensional voxel for each rendered image frame may be correlated with a stimulus specific CPF and/or tCPF illustrating the cognitive plasticity acquired by the subject for movement of that specific voxel for a given stimulus.

$$P(t=n) = \begin{bmatrix} S_1 \cdot x_{1,t=n} & \cdots & S_1 \cdot x_{n,t=n} \\ \vdots & \ddots & \vdots \\ S_n \cdot x_{1,t=n} & \cdots & S_n \cdot x_{n,t=n} \end{bmatrix} \quad (3)$$

In several embodiments, the static and dynamic correlations may be repeated and stored in correlative database 170 and data store 174. Moreover, some examples include receiving historical data from historical data feed 172. The historical data may be video or still images, either external (e.g. video or still pictures from a digital optical camera) or internal in nature (e.g. X-Rays, MRIs, CT Scans, Ultrasounds). The historical data may give additional visual reference points for a subject as exposed to a specific stimulus, and may even be used to empirically calculate a CPF and/or tCPF by demonstrating the repeatability of specific geospatial responses by the subject to the same stimulus and/or the physically observable response times. The historical data may then be compiled in correlative database 170 and processed by correlation engine module 130 to supplement other image and CPF and/or tCPF data. Accordingly, in some embodiments, a predictive virtual personification may be generated from the historical data sets alone by correlating empirically calculated CPF and/or tCPF data with historical image data, and rendering the virtual personification accordingly. In that example, static modalities 110 and 120 and dynamic image modalities 140 and 150 are not required to generate a predictive virtual personification.

In several of these embodiments, the predictive quality of a virtual personification may be extrapolated by predictive rendering engine 200, and the virtual personification may be extrapolated and rendered by 3D rendering engine 160. For example, a subject geospatial response to a stimulus may be rendered in three dimensions by 3D rendering engine 160, and then correlated to a CPF and/or tCPF through correlation engine module 130 and stored in correlative database 170. Then, in a virtually rendered environment, the virtual personification may be exposed to a particular stimulus or given a specific activity to perform, such that predictive rendering engine 200 may determine, probabilistically, how a subject may respond by accessing responses to similar stimuli in the correlative database 170 and extrapolating to a probabilistically likely response based on the previous response(s) and a stimulus specific CPF and/or tCPF. If the stimulus specific CPF and/or tCPF is sufficiently high, then the predictive rendering engine will determine that the rendered response to the new stimulus is likely to be similar to the subject's previously captured response. In contrast, if the CPF and/or tCPF is low, then the predictive rendering engine will determine that the rendered response to the new stimulus is likely to be more random.

Figure 2:
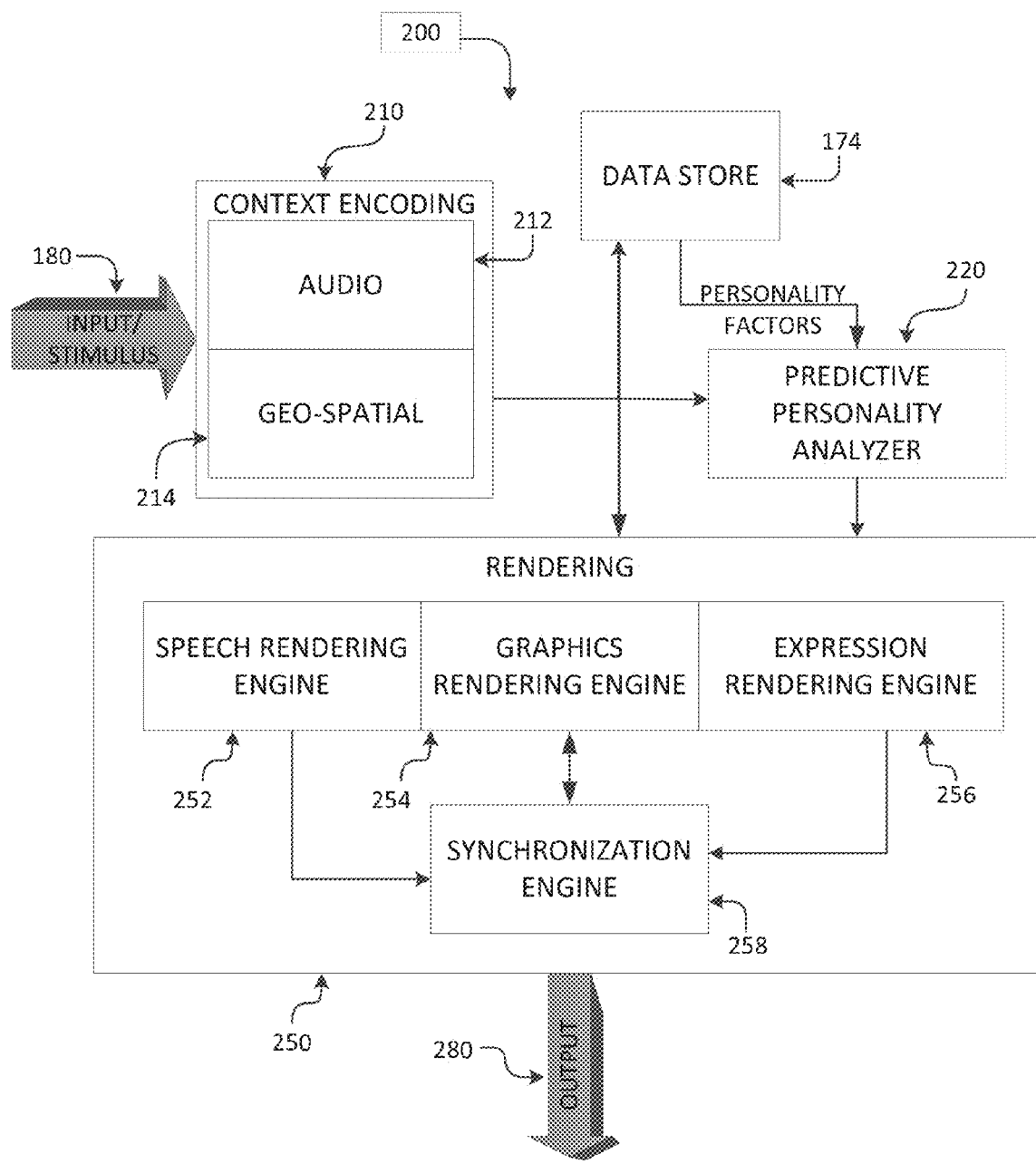
FIG. 2 illustrates an example predictive rendering engine that may be used in implementing various features of embodiments of the disclosed technology.

FIG. 2 illustrates an example predictive rendering engine. An example predictive rendering engine 200 may include an context encoding module 210 that is configured to convert and categorize input data into computer readable contextual data sets. For example, context encoding module 210 may include an audio context encoding sub-module 212 and a geospatial context encoding sub-module 214, wherein each context encoding sub-module may be configured to receive input data 180 and convert the input data into a predictive rendering context using one or more context conversion algorithms. For example, the context conversion algorithms may interpret and catalog the input data into predetermined categories with specific context related parameters (e.g. a baseball approaching at a particular speed with particular geospatial coordinates in relation to a baseball bat being held by the predictive virtual personification). The conversion algorithms may also append response tags to the contextual data sets. The response tags, for example, may correspond to anticipated emotional states (e.g. surprise, shock, sadness, happiness, elation, fear, etc.).

In some examples, the input data 180 may be historical data, geo-spatial imaging data, or neuro-cognitive imaging data as described with respect to FIG. 1. Input data 180 may include environmental and/or interactive data from a rendered or real environment. In some embodiments of this disclosure, the predictive virtual personification may be configured to interact within a graphically rendered environment. The rendered environment could be a three dimensional rendering of a particular real or imaginary environment, such as would be depicted in a video game, a movie, a television broadcast, and Internet broadcast, or other multimedia depiction. Moreover, other rendered characters may also interact with environment. Input data 180 may include a set of changes to the rendered environment (e.g. characters moving within the environment or changed environmental conditions).

In several embodiments of this disclosure, the response tags correlate may observe emotional responses that particular donor subject may have exhibited in response to the same or similar stimuli, as recorded by geospatial and neuro-cognitive imaging. For example, a system for generating a predictive virtual personification, as disclosed with respect to FIG. 1, may be used to detect a donor subject's emotional state as triggered by specific stimuli based on neuro-cognitive responses (e.g. detecting neural pathways that are activated when a donor subject is surprised, happy, sad, etc.), as correlated with specific facial and body language responses (e.g. smiling, crying, wincing, flinching, etc.). These neuro-cognitive and geospatial responsive data sets may be stored with respective correlated response tags in data store 174. Context encoding module 210 may then assign one or more response tags to input data 180 through known audio and video signal analysis techniques to identify a specific stimulus (e.g. an approaching baseball) by correlating the analyzed data with historical data catalogs to assign a known response tag to the input data. The response tag may then be used as an index to retrieve a set of context specific rendered and historical response parameters, as well as a set of personality factors, from data store 174. For example, historical response parameters may include specific image data sets of facial expressions and body language associated with the respective response tag for a particular donor subject, and rendered response parameters may include context appropriate rendered graphical data to fill in gaps where no historical data is available (e.g. no image data of that particular emotional response was ever captured for the particular donor subject).

The historical response parameters and the rendered response parameters may be compiled by rendering module 250 to generate one or more three dimensional graphical video image data sets depicting a possible reaction to the input data set 180, visualized as a multidimensional possible graphical response vector $\vec{G}_i$ for each i=0 to m, and wherein m possible graphical responses are generated by graphics rendering engine 254 based on available historical and rendered response parameters. The historical response parameters and the rendered response parameters may also be compiled by rendering module 250 to generate one or more audio data sets depicting a possible audible reaction to the input data set 180, visualized as a multidimensional possible audio response vector, $\vec{A}_j$, for each j=0 to n, and wherein n possible audio responses are generated by audio rendering engine 252 based on available historical and rendered response parameters. Together, possible response vectors $\vec{G}_i$ and $\vec{A}_j$ make up the possible audio visual response space AV(i,j) as illustrated by Equation 4.

$$AV(i,j)_{0,0}^{m,n} = \{\vec{G}_i, \vec{A}_j\}, \text{ for } 0 \leq i \leq m;\ 0 \leq j \leq n \quad (4)$$

Still referring to FIG. 2, a predictive rendering engine 200 may also include a predictive personality analyzer 220. Predictive personality analyzer 220 may receive context specific rendered and historical response parameters, as well as donor subject specific personality factors $w_k$ (for each k between 0 and r, and wherein r personality dimensions stored in data store 174 for the particular donor subject) and calculate predictive personality-based reactions to a particular stimulus. For example, personality factors $w_k$ may include conscientiousness, agreeableness, extraversion, openness, neuroticism, or other known personality dimensions. This data can be compiled and stored in data store 174 based on personality tests taken by the donor subject (e.g. Briggs-Meyers personality tests), from input by other persons who may know or have known the donor subject, or from historical data sets that include video and audio data demonstrating the donor subject's reactions to various stimuli. Predictive personality analyzer 220 may apply the personality factors, along with the response tag(s), to generate a personification probability factor $PPF(w_k)$. Personification probability factor $PPF(w_k)$ incorporates a donor subject's observed tendencies to assign a probability to each response vector $\vec{G}_i$ and $\vec{A}_j$ to modify the possible audio visual response space $AV(i,j)_{0,0}^{m,n}$ into a probable audio visual response space PAV(i,j) as illustrated by Equation 5.

$$PAV(i,j)_{0,0}^{m,n} = \{PPF(w_{ik})\vec{G}_i, PPF(w_{jk})\vec{A}_j\}, \text{ for } 0 \leq i \leq m;\ 0 \leq j \leq n;\ 0 \leq k \leq r \quad (5)$$

In several example embodiments, predictive personality analyzer 220 may calculate and output a predictive probability factor $PPF(w_k)$ for each donor subject and each input data set 180, and rendering module 250 may then receive both audio visual response space AV(i,j) from data store 174 and the personification probability factor $PPF(w_k)$ from the predictive personality analyzer 220, to generate the probably audio visual response space PAV(i,j). Accordingly, speech rendering engine may then calculate a probabilistic audible response vector, $\vec{A}$, to input data set 180, and graphics rendering engine 254 may calculate and render a probabilistic three dimensional video response vector, $\vec{V}$ to input data set 180.

Still referring to FIG. 2, a predictive rendering engine 200 may also include expression rendering engine 256, incorporated in rendering module 250. Expression rendering engine 256 may receive historical graphical data from data store 174 and combine with personification probability factor $PPF(w_k)$ to calculate a probabilistic expression vector $\vec{E}$. Both response vectors $\vec{A}$ and $\vec{V}$ may be modified by expression vector $\vec{E}$ and interlaced into a single audio visual output 280 by synchronization engine 258.

In some examples, predictive personality analyzer 220 may also calculate a mood parameter, $\mu(l)$, based on general long term personality trend factors l (i.e. moods), that have been observed in the donor subject or that are available from historical data. For example, mood parameter $\mu(l)$ may be applied as a coefficient to modify personification probability factor $PPF(w_k)$, resulting in a mood-dependent personification probability factor $\mu(l) PPF(w_k)$. Accordingly, rendering module 250 may output mood dependent audio visual response vectors $\mu(l) \vec{A}$ and $\mu(l) \vec{V}$.

In some embodiments of the disclosure, the predictive virtual personification may be configured to interact with a real environment (e.g. as a hologram, robot, mechanical doppelganger, or other representative form of the donor subject). Input data 180 may include a set of changes to the real environment as captured by geospatial image capture equipment, audio capture equipment, or other environmental monitoring equipment.

In some examples, a system for generating a predictive virtual personification includes analyzing and storing a rhythmic entrainment cycle. As used herein, a rhythmic entrainment cycle describes a learned pattern of responses an individual may exhibit when exposed to a particular stimulus. For example, an individual may develop specific habits or mannerisms, such as baseball players who always take the same stance in the batter's box, perform the same rituals before the pitch comes, or swinging in a certain style in response to different types of pitches. While these mannerisms and habits may have not existed when the baseball player first started playing baseball, they did take hold over many days, weeks, month, or years of performing the same tasks in the same ways. All individuals may exhibit similar mannerisms and/or habits, that form overtime, in response to many different stimuli (e.g. sneezing or coughing a certain way, driving a car with one hand on the wheel, knocking on a door, etc.). These mannerisms and habits form specific neural pathways in the brain that correlate to the repeated reactions to stimuli, and as the neural pathways become more stable, responses become quicker to the same stimuli, and more predictable. Thus, rhythmic entrainment is the process whereby these predictable responses to the same repeated stimuli take form, and the level of rhythmic entrainment can be measured by analyzing either neuro-cognitive image data sets while these specific tasks are being performed and measuring a CPF and/or tCPF, as described with respect to FIG. 1, or by measuring historical geospatial data sets acquired over time of a donor subject reacting to the same stimuli, or by a combination of both methods. Accordingly, the CPF, or other measurements of rhythmic entrainment, may be applied by predictive rendering engine 200 to modify personification probability factor PPF($w_k$). For example, a higher level of rhythmic entrainment of a response to a particular stimuli will be directly proportional to a higher stimuli-specific personification probability factor PPF($w_k$).

Still referring to FIG. 2, output data set 280 may be referred to as a donor's personified self DPS=PAV(i,j). The DPS, then, may be configured to react to object within either a real or rendered environment (e.g. walls, doors, chairs, or other objects in a room, faces, expressions, or movements from another person, etc.). In an in-phase mode, the predictive virtual personification may interact with all changes to the rendered environment, including changes caused by other rendered characters, whereas in an out-of-phase mode, the predictive virtual personification may only interact with changes to environmental conditions, but not with other characters in the environment.

Figure 3:
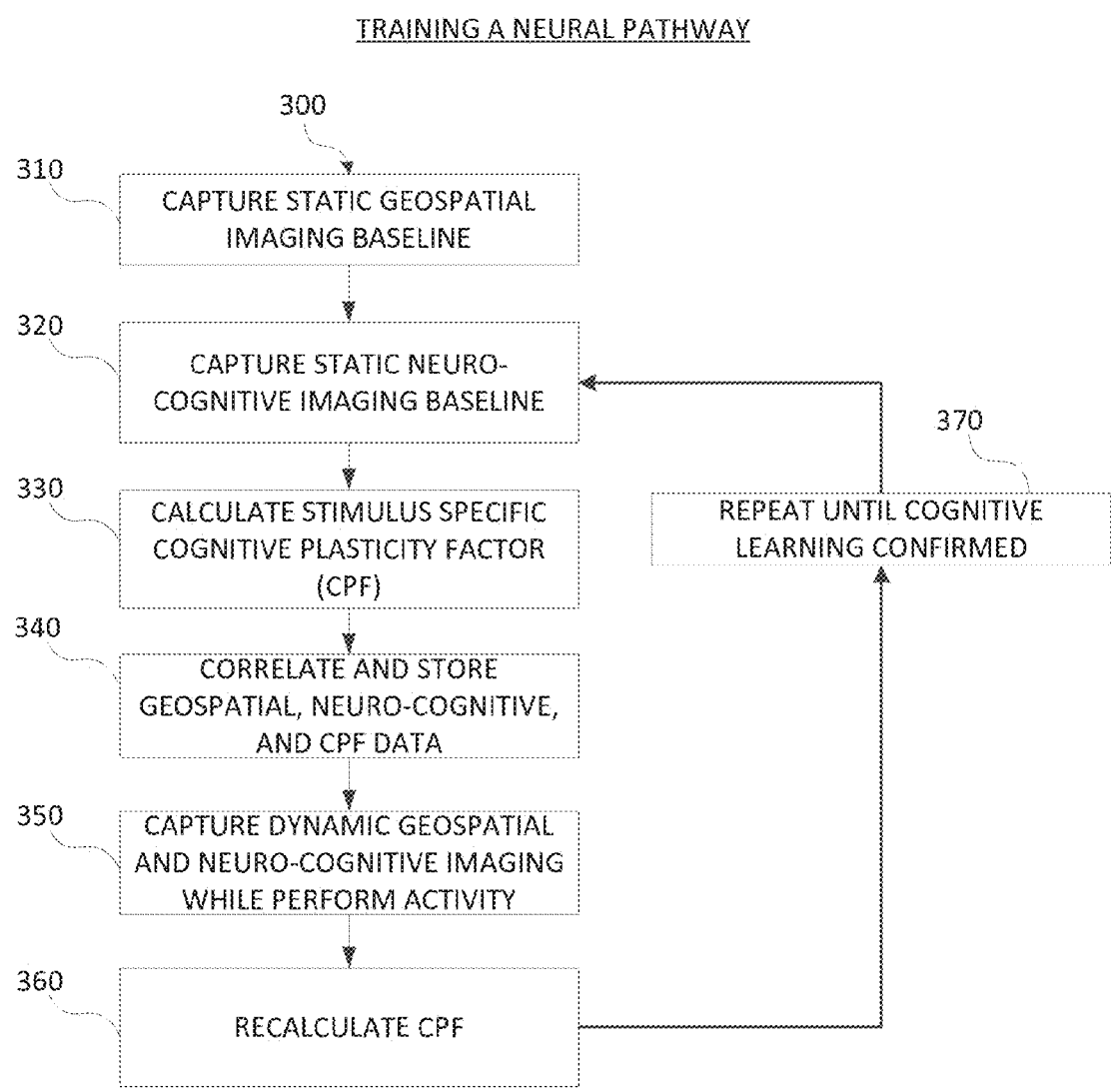
FIG. 3 is a flow chart illustrating a method for training a neural pathway consistent with embodiments of the disclosed technology.

FIG. 3 is a flow chart illustrating an example method for training a neural pathway. Referring to FIG. 3, the method may include capturing a static geospatial image baseline at step 310, capturing a static neuro-cognitive baseline at step 320, calculating a CPF and/or tCPF at step 330, and correlating and storing the geospatial, neuro-cognitive, and CPF and/or tCPF data at step 340. Some embodiments may also include capturing dynamic geospatial and dynamic neuro-cognitive imaging while a subject performs an activity or reacts to a stimulus at step 350. The method may also include recalculating the CPF and/or tCPF at step 260 and repeating steps 320, 330, 340, 350, and 360 of the method until the CPF and/or tCPF surpasses a predetermined threshold value (i.e. the subject learns to perform the task or react to the stimulus sufficiently well).

Example 1

A novice golfer desires to perfect his putting capability. First, static geospatial image sets of the golfer are taken to capture the golfer's anatomical features. These image sets may include optical imaging and CT scanning to capture the golfer's anatomy. A three dimensional rendering of the golfer may then be calculated. Then, baseline static neuro-cognitive image sets of the golfer are taken. Static neuroimaging sets may be taken with MEG, EEG, or FMRI to get a baseline view of the neural pathway responses to specific activities, including putting a golf ball. To statically capture the golfer's neural pathway activation, the golfer may simply imagine he is putting the golf ball while fMRI, EEG, and/or MEG images are captured, illustrating which neural pathways cause the golfer to think about putting the ball (which will be theoretically similar to the same pathways that actually activate if the golfer really puts the ball, with some minor deviation such as activation of the motor cortex). If the golfer repeats this process multiple times of imagining putting the golf ball while neural imaging is performed, the neural pathway repeatability and/or variance can be measured showing how much variance there is in the specific neural pathways responsible for putting a golf ball. From that measurement, a CPF can be calculated and stored with the other baseline data. Alternatively, the neural pathway activation response time can be measured to calculate a baseline $\Delta t_0$. The task can then be repeated and a $\Delta t_1$ can be calculated and compared to the $\Delta t_0$ to calculate a baseline $tCPF_0$.

After baseline images are captured and stored, the golfer may actually dynamically perform the movements with his arms and hands required to put a golf ball while dynamic geospatial and neuro-cognitive image sets are captured. For example, the neuro-cognitive image sets may be captured on MEG and/or EEG modalities while optical high-frame-rate video, standard video, and/or MOCAP technology is used to capture the geospatial movement. The MEG and EEG data can be correlated with the baseline neuro-cognitive data to demonstrate correlation in the activated neural pathways, and the dynamic geospatial data can be correlated with the static baseline geospatial data to provide additional data points for three-dimensional rendering of a virtual personification of the golfer.

Still referring to Example 1, the golfer repeats the putter swing multiple times, each time repeating the image capture. The geospatial data can be compared from swing to swing to detect variances in the swing, and those variances can be correlated with neural pathway variance and/or response time, as applied in a CPF and/or tCPF value. Initially, a novice golfer should have a low CPF (and/or high tCPF) as correlated with a relatively high degree of swing variance. However, as the golfer learns to put more precisely, the CPF value will increase (and/or tCPF value will decrease) along with the putting precision, and neural pathway variance decrease and geospatial movement variance will decrease. These changes, as tracked by the increasing CPF (and/or decreasing tCPF) as correlated with geospatial swing repeatability can be tracked and displayed as feedback to the golfer until satisfied that the swing is learned.

The same method illustrated in Example 1 may be applied to any learned activity or stimulus response, such as swinging a bat, swinging a tennis racket, playing an instrument, driving a car, flying a plane, shooting a weapon, or any other training activity. Moreover, the activity and learning paradigm may incorporate other stimuli, such as changed playing conditions, dangerous obstacles, weather, or other stimuli that the subject may then learn to properly respond to the stimuli. For example, an airline may train its pilots to respond to wind shear or engine out threats by using this same training paradigm, and may require that each pilot achieve a specific threshold CPF and/or tCPF value before being allowed to fly a real plane. Other example applications of this training method are possible as would be understood in the art.

Example 2

As illustrated in FIG. 2, another example application of the learning paradigm entails rehabilitating injured patients. Certain brain or spine injuries may cause a patient to lose the use of specific neural pathways, and thus, certain activities may be impacted. For example, a stroke patient may lose the ability to speak without slurring words because a specific neural pathway becomes damaged. However, the patient may learn to use a new neural pathway to perform the same activity. The same method described in FIG. 2 is applicable. First, baseline geospatial and neuro-cognitive images may be taken, correlated, and rendered to illustrate how the patient's mouth moves while speaking and what neural pathways are active. Without the injury, the same neural pathway would be repeatability activated, but with the injury, that pathway may be damaged.

Still referring to Example 2, as new neural pathways are sought by the patient's brain, neural pathway variance may be high, and CPF low (and/or neural pathway activation response time may be high and tCPF may be high). In this learning paradigm, historical data may be imported to compare geospatial imaging of the subject performing the same tasks (e.g. speaking certain words) before the stroke. The geospatial data can be compared to help correct motor and speech, and as those corrections are made, CPF and/or tCPF values can show how well the subject is learning to use new neural pathways to accomplish the same tasks. The subject will be successful when the CPF and/or tCPF value surpasses a predetermined threshold level. The same learning paradigm may be used in all types of physical therapy and rehabilitation.

Figure 4:
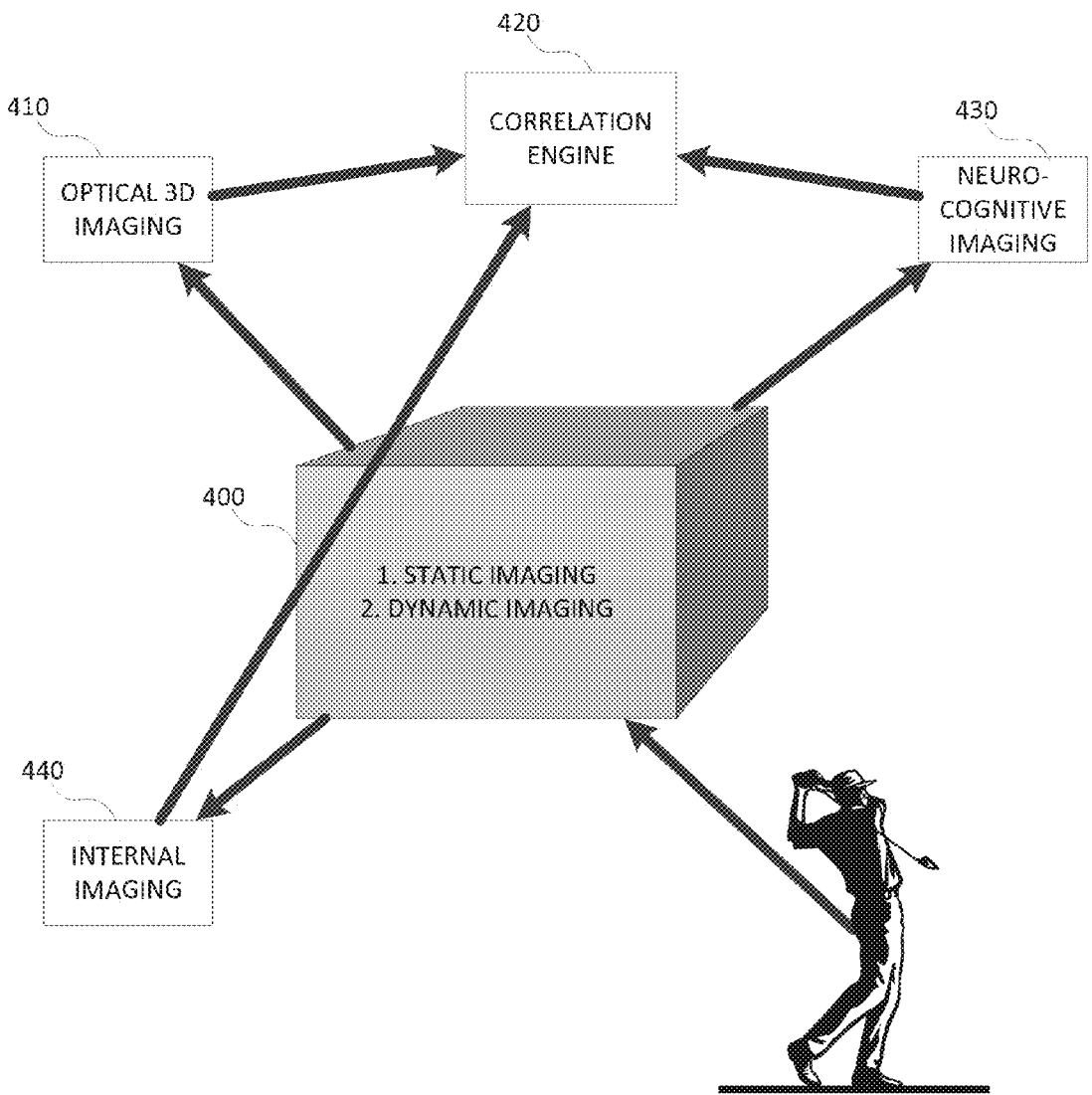
FIG. 4 illustrates an example system for generating training a neural pathway consistent with embodiments of the disclosed technology.

FIG. 4 illustrates an example system for training a neural pathway. Some embodiments of the method disclosed in FIG. 3 and Examples 1 and 2 may be performed using the system disclosed in FIG. 4. A system for training a neural pathway may include an environment isolation device 400. For example, environment isolation device 400 may be a box configured to enable a subject to insert a specific anatomical component (e.g. a leg or an arm) such that the environmental conditions affecting that anatomical component are controlled (e.g. the level of light, wind, moisture, humidity, or other environmental conditions may be precisely controlled). Some embodiments may also include an optical 3D imaging modality 410, neuro-cognitive imaging modality 430, and correlation engine module 420, wherein optical 3D imaging modality 410 may be optically coupled to environmental isolation device 400 and configured to capture static and dynamic optical image sets of a subject's anatomy inside the environmental isolation device 400. Neuro-cognitive imaging modality 430 may be worn by the subject (e.g. an MEG or EEG), or may be in a separate location (e.g. a functional MRI device). Both optical 3D imaging modality 410 and neuro-cognitive imaging modality 430 may transmit imaging data sets to correlation engine 420, wherein correlation engine 420 is configured to correlate geospatial imaging data sets with neuro-cognitive imaging data sets, and calculate and correlate CPF and/or tCPF values to the imaging data sets such that, as a subject repeats a particular task, neural pathway variance and/or activation response time is measured and used to calculate the CPF and/or tCPF values. Some embodiments may also include an internal imaging modality 440 configured to transmit internal imaging data (e.g. X-Ray, CT Scan, MRI, Ultrasound) to correlation engine 420 such that internal imaging data and optical 3D imaging data may be combined and used to render a virtual personification.

Figure 5:
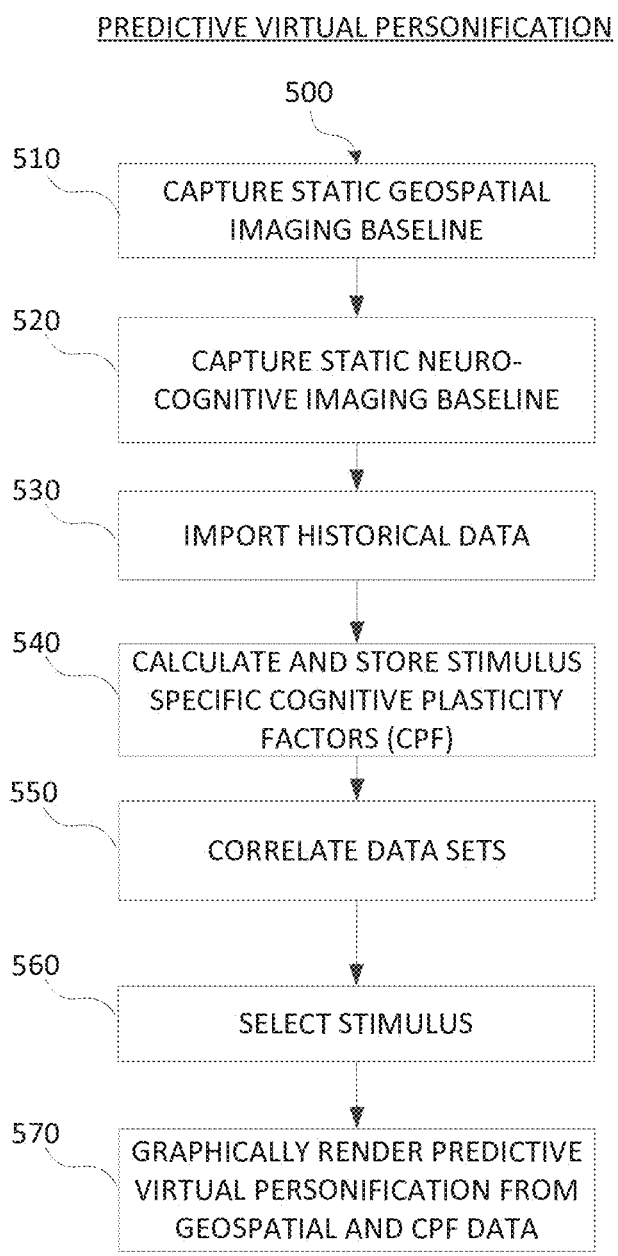
FIG. 5 is a flow chart illustrating a method for generating a predictive virtual personification using cognitive and geospatial imaging analysis.

FIG. 5 is a flow chart illustrating a method for generating a predictive virtual personification using cognitive and geospatial imaging analysis. An example of the method includes capturing a static geospatial imaging baseline at step 510 and capturing a static neuro-cognitive imaging baseline at step 520. For example, static geospatial imaging baseline may include external imaging modalities such as digital cameras. In some examples, the digital camera may be a mobile device camera and image data may be transmitted over the Internet or via wireless data networks. The static geospatial imaging baseline may also include internal imaging modalities such as X-Ray, CT scanners, MRIs, Ultrasounds, or other internal imaging devices as known in the art.

Still referring to FIG. 5, the method may also include importing historical imaging data at step 530, calculating and storing CPF and/or tCPF values at step 540, and correlating data sets at step 550. For example, historical data may include archives of still photographs, videos, movies, television clips, medical records, medical images, or other available data specific to a subject that may provide static or dynamic anatomical evidence of the subject, including evidence of how the subject may have previously performed certain tasks and/or activities, and how the subject may have reacted to specific stimuli. The CPF values may be calculated from calculating trend variance of neural pathway use in response to repeated exposure specific stimuli overtime, as observed using neuro-cognitive imaging. Alternatively, tCPF values may be calculated from calculating changes in neural pathway activation response times in response to repeated exposure specific stimuli over time, also as observed using neuro-cognitive imaging.

In other embodiments, empirical analysis of historical data may be used to extrapolate a CPF and/or tCPF value from a subject's anatomical movement variance and/or response time changes over repeated performance of the same task, activity, or stimulus response. Data correlation at step 550 may include correlating internal and external geospatial imaging data sets with neuro-cognitive imaging data sets, CPF and/or tCPF values, and historical data to determine empirically the repeatability of a subject's anatomical movement responses, and/or physically observable reactive response times, to a wide range of data points. For example, correlation data may be calculated using the calculation methods illustrated in Equations 1 and 2.

Still referring to FIG. 5, examples of the method may also include graphically rendering a predictive virtual personification from the geospatial data at step 570. The graphical rendering may include image signal processing methods such as time mapping, warping, high dynamic range to low dynamic range conversion, morphing, or other rendering and image processing techniques as known in the art. The resultant rendered image sets may depict a life-like/anatomically correct three dimensional depiction of the subject, and through image processing, the rendered three dimensional depiction can simulate anatomically correct movement. For example, even though geospatial imaging may have not captured image data sets of a subject playing tennis, the rendering techniques described above may be used to extrapolate the anatomical movements necessary to swing a tennis racket and apply them to the rendering. Accordingly, a graphically rendered predictive virtual personification can depict the subject with anatomical accuracy and enable anatomical movement in response to artificial (previously unrecorded) stimuli. Thus, the method enables selecting a new stimulus at step 460 and applying that stimulus to the predictive virtual personification, such that the predictive virtual personification may respond to the new stimulus based on the geospatial predictive algorithms described above, and in a manner that is either more or less predictable or random depending on the correlated stimulus specific CPF and/or tCPF.

Example 3

In one example application of a method for generating a predictive virtual personification, a deceased subject may be virtually re-personified for entertainment purposes (e.g. a predictive virtual personification of a deceased actor may be incorporated into a film starring that actor to avoid rewriting a script after the actor passes away). In this example, the deceased subject may either create the predictive virtual personification pre-mortem or post-mortem. If planned pre-mortem, the process used may parallel the method disclosed in FIG. 5. Initially, pre-mortem static geospatial and neuro-cognitive image data sets may be captured and stored in a database. Stimulus specific CPF and/or tCPF values may also be calculated and stored, and the data may be correlated and rendered consistent with the methods disclosed herein. Thus, a predictive virtual personification representing the subject pre-mortem is created. Then, post-mortem, image processing methods may be applied to the predicative virtual personification to adjust for known aging variables (e.g. skin wrinkles may be added, hair and skin coloring adjusted, and movement algorithms adjusted to account for age). The predictive virtual personification may be entered into a virtual environment consistent with the post-mortem application (e.g. if a movie, then the virtual environment would replicate the movie set for any given scene).

Still referring to Example 3, in an out-of-phase mode, the predictive virtual personification may be configured to perform specific activities (e.g. swinging a golf club as part of a movie scene), but is unaware of other dynamic conditions in the virtual environment, such as another actor or virtual personification moving in the scene.

Alternatively, still referring to Example 3, in an in-phase mode, the predictive virtual personification may be configured to simultaneously perform activities and tasks while also responding to external stimuli, such as other subjects and/or virtual personifications within the virtual environment. In this mode, the predictive virtual personification may use the correlated CPF and/or tCPF, and rendered image data to interact in an anatomically and socially appropriate manner within the virtual environment, and the reactions will reflect the personality and anatomical mannerisms of the pre-mortem subject.

In some embodiments of this disclosure, a predictive virtual personification server may reproduce a donor subject's personality by gathering, defining, categorizing and/or mathematically establishing conditional probabilities relating visually and/or auditorily observable characteristics of the donor subject's personality, mood transitions, actions and activities. The predictive virtual personification server (PVP server) may then render an animated representation of the donor subject—or a predictive virtual personification—that incorporates these same traits. Moreover, the predictive virtual personification may evolve over time, either by incorporating additional samples of observable visual and/or auditory patterns related to those traits, and/or by applying the CPF, as disclosed herein, to modify the predictive virtual personification's behavior over time (e.g., as the predictive virtual personification learns or adjusts to different environments).

In some embodiments, a personification consciousness validation model is developed through the correlations of rhythmic entrainment, observable through neural and/or functional imaging, with visually and/or auditorily observable behavior patterns. Accordingly, a PVP may generate the probability values relating a donor subject's observed response to emotions, moods, and personality interactions and responses coded in a dialogue database.

As used herein, personification can mean the attribution of personal qualities and the representation of those qualities or ideas in or from the human structures and forms (e.g., behavioral patterns, emotions, tendencies, movement patterns, stimulus response patterns, etc.)

One embodiment of this disclosure is directed towards re-construction of a predictive virtual personification capable of spontaneous interaction with an environment that includes speech, comprehension, emotional expression through gestures, reactions, and tone of voice, and other physical behavior patterns.

In some embodiments, methods for generating a predictive virtual personification include identifying neural activity within a donor subject's human brain by correlating said neural activity to visually and/or auditorily observable actions and/or responses to stimuli, whether those stimuli are external or internal to the donor subject.

These observable actions and/or responses may be attributable to a phenomenon known as rhythmic entrainment. As used herein, the term rhythmic is associated with identifying rhythmic activities in the core of the brain. These rhythmic activities are markers for the various conscious states. The term brainwave entrainment represents a donor subject's brain's and body's responses to a given stimuli causing rhythmic entrainment of the brainwaves to measurable frequencies and observable structure (e.g., through an MEG or EEG).

A donor subject's cognitive rhythmic entrainment processes may be observed, captured, measured, and stored using imaging and analysis systems described herein. Rhythmic entrainments may include a donor subject brain's neural activities generated in response to a stimulus. Rhythmic entrainment involves conditioning responses to that stimulus within a network of neurons inside the brain. The CPF, as described herein, is thus related to and in fact describes this rhythmic entrainment process.

Similarly, actions, reactions, emotions and mood expressions are also dependent from rhythmic entrainment. Moreover, these traits may all be physically observable through interdependencies within the brain, such that a donor subject's response to any given stimuli may be colored by that subject's current emotional state (a time specific state), as well as the subject's personality, or learned behavior (colored by deep-rooted rhythmic entrainment). Not only can this rhythmic entrainment be measured through neural and/or functional imaging (e.g., through measurement of brain waves and/or brain function), but also through physically observable characteristics such as micro-movements, twitches, reflexes, breathing patterns, rolling eyes, beads of sweat on the brow, etc. These externalizations of a donor subject's internal neural activity are, thus, predictable within a certain degree of uncertainty (related to the CPF, as described herein).

Figure 6:
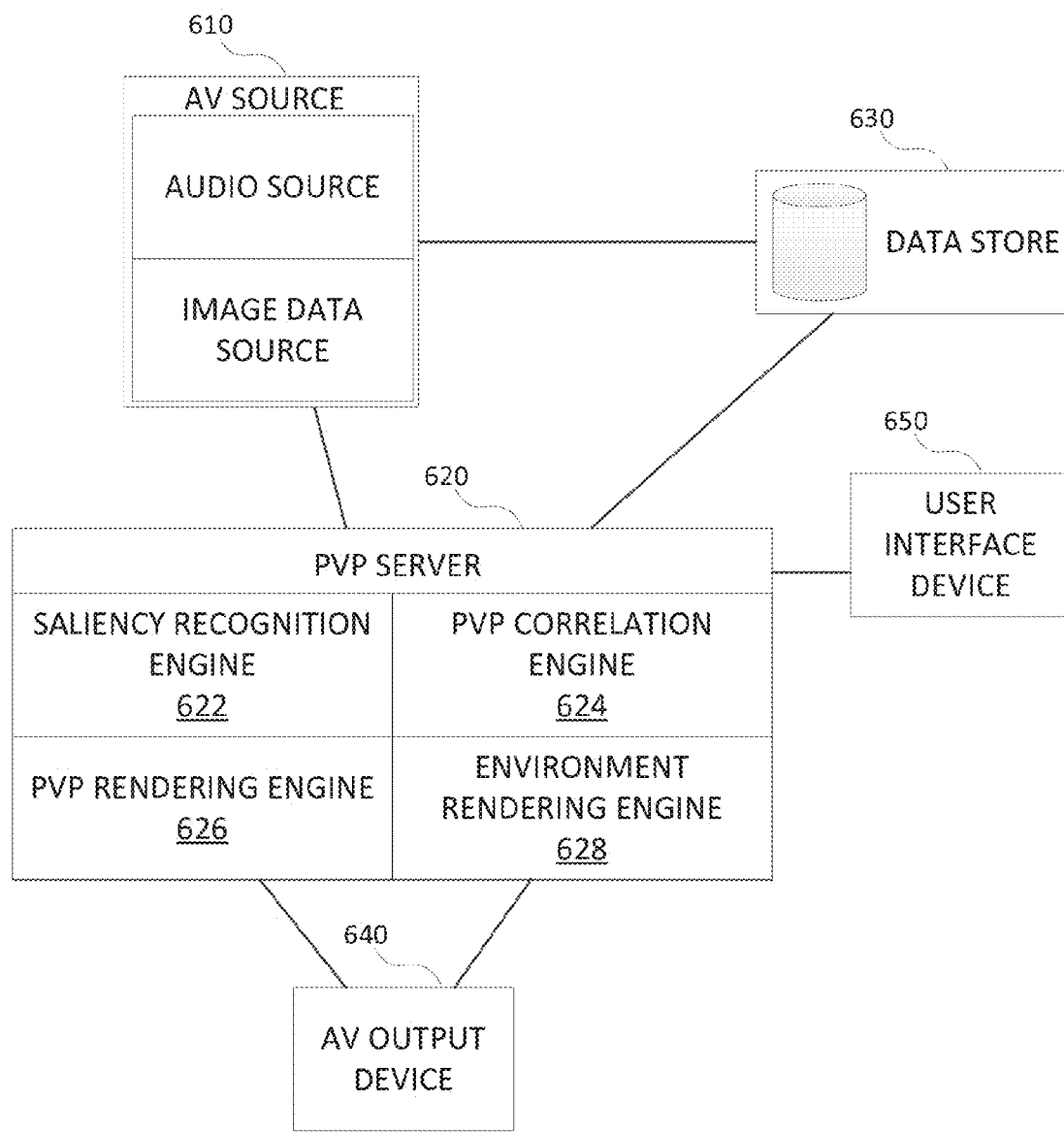
FIG. 6 is a diagram illustrating a system for generating a predictive virtual personification, consistent with embodiments disclosed herein.

FIG. 6 is a diagram illustrating a system for generating a predictive virtual personification, consistent with embodiments disclosed herein. As illustrated, a system for generating a predictive virtual personification includes an audio-visual (AV) data source 610, a predictive virtual personification (PVP) server 620, a data store 630, and an AV output device 640. AV data source 610 may be a historical archive or a live data source. For example, the historical archive may be video, movie, television, medical imaging, or other historical video and audio data. The data may initially reside in an analog format, in which case the system may also include an analog-to-digital conversion module that will convert the AV data to a digital format. The medical imaging data may be from any of the medical imaging modalities disclosed herein. For example, the medical imaging data may include functional brain imaging data such as functional PET, functional MRI, MEG, or EEG data.

The AV data source 610 may also be a live data source. For example, the AV data source may be one or more video cameras configured to capture video and audio of a donor subject. In some embodiments, the one or more video cameras are high-speed, ultra-high speed, high resolution, and/or ultra-high resolution cameras. Multiple cameras may be configured to capture video from multiple points of view as to capture three dimensional data, and reconstruct a three dimensional image of the subject. In some embodiments, the multiple cameras may be configured to capture images of a donor subject from multiple perspectives (for example, by surrounding a subject with 6 cameras, each configured to capture a 60 degree field of view). The AV source need not be a video camera. For example, other optical imaging techniques may be used, such as laser imaging. In some examples, the AV source is a 3D laser imaging system, such as a nanophotonic coherent imager. In other examples, the AV source may be a multi-array data capture device. Other AV sources may be used as would be known in the art.

PVP server 620 may include a saliency recognition engine 622 and a PVP correlation engine 624. Saliency recognition engine 622 may be configured to receive one or more AV data sets from the AV data source and identify salient features within those data sets. For example, one or more saliency regions of interest SROI's may be defined and observed by the saliency recognition engine. These features may be identified using pattern recognition algorithms as known in the art. For example, SROI's may include a donor subject's face and/or aspects therein, including the cheek, mouth, nose, eyes, eyelids, brow, or ears. SROI's may also include a donor subjects, shoulders, hands, arms, legs, torso, chest, abdomen, etc. The SROI need not be visual content, but instead may be audio content. For example, breathing sounds, or voice cadence, pitch, and/or volume.

In the examples whereby the SROI is video content, the saliency recognition engine 622 may use known saliency identification methods, along with pattern recognition algorithms, to identify and track the SROI within the video content, as differentiated from background objects. For example, the saliency recognition engine may identify geospatial characteristics within pixels, or voxels in the case of a three dimensional data set, and determine that the geospatial characteristics match a pre-determined unique pattern that defines the SROI. Initially, individual SROI's may be manually defined through user interface 650. For example, a user may freeze the video content and identify one or more SROI's by highlighting/selecting the region with a cursor, box, or free-form drawing tool. Alternatively, the SROI's may be pre-coded into the saliency recognition engine. In either case, the saliency recognition engine then determines whether the SROI is an actual salient feature by comparing multiple image frame data-sets taken in sequence, and determining if the SROI moves independent of any of the other features in the background and/or the donor subject. These movements, for each SROI, can be tracked over time to generate an SROI-specific saliency map, that can then be correlated to other SROI-specific saliency maps, and/or triggering events. These SROI-specific saliency maps may be stored in data store 630.

PVP server 620 may also include PVP correlation engine 624. PVP correlation engine 624 may receive one or more SROI-specific saliency maps from data store 630, as well as one or more event maps from data store 630. For example, an event map may identify a specific time that a stimulus event occurred and the specific type of stimulus event. The event map may be manually entered through user interface 650, may be automatically identified as a first saliency peak in one or more of the SROI-specific saliency maps, or coded into the PVP correlation engine. For example, stimulus events may be reactions to a change an environment, such as an oncoming baseball, oncoming car traffic, physical contact from another person, etc. The stimulus event may also be a decision internal to the subject such as the decision to throw a ball, hit a golf ball, run, walk, sing, etc. The stimulus even may also be an audio stimulus such as a question posed by another subject, or the sound of an oncoming car.

PVP correlation engine 624 may then analyze a SROI-specific saliency map to correlate the movement of the SROI within the SROI-specific saliency map with the stimulus event. Accordingly, the saliency map may display several micro-movements, jitters, or macro-movements between the time of the stimulus event and the time of an active response. The active response, for example, may be the swing of a bat at a baseball, swing of a golf club at a golf ball, throwing of a baseball, etc. Other active responses are possible, even if subtle, such as an active response of walking up to a microphone and singing a note following the stimulus event of the subject's decision to sing into the microphone. In some examples, the stimulus event may be identified by first detecting the active response, and then analyzing some or all of the SROI-specific saliency maps to determine when the stimulus event occurred.

Saliency map patterns from the SROI-specific saliency maps for each particular stimulus event should be unique to a particular subject, and thus allow for automated recognition of that subject. In some embodiments, the PVP server may augment SROI-specific saliency map data with CPF scores, or predicted CPF scores, to account for learning patterns that may modify the SROI-specific saliency map (e.g., the saliency map from a batters hands in the context of a batter swinging at an oncoming pitch may change slightly as the batter becomes more comfortable through batting practice—this change may be estimated using a CPF).

PVP correlation engine 624 may identify within each SROI-specific saliency map the stimulus event and the active response, and then return the correlated SROI-specific saliency map to the data store.

PVP server may also include PVP rendering engine 626. PVP rendering engine 626 may receive subject dependent image data sets and audio data sets, and incorporate 2D and 3D rendering algorithms to render a 2D or 3D animated representation of the subject. PVP rendering engine 624 may also receive correlated SROI-specific saliency maps from the data store and apply those maps to the animated representation of the subject to create a predictive virtual personification. PVP rendering engine 624 may also receive user input from user interface 650 to identify one or more target stimulus events to present to the predictive virtual personification. PVP rendering engine 626 may then animate the predicative virtual personification and apply the set of correlated SROI-specific saliency maps that relate to the target stimulus events to direct the animation of the predictive virtual personification. For example, the target stimulus event may be a decision to start singing a song. The PVP rendering engine may then receive, for each SROI, the correlated SROI-specific maps related to the stimulus event wherein the subject decided to start singing a song and apply those changes to the pixel and/or voxel maps generated by the PVP rendering engine to animate the predictive virtual personification in the same way that the original subject would have reacted to the same stimulus. In some embodiments, the PVP rendering engine may weight each of the SROI-specific maps according to a CPF, such that as a subject, or predictive virtual personification, becomes more comfortable reacting to a particular stimulus, the SROI-specific maps compress such that the time shortens between the stimulus event and the active response.

The PVP server may also include environment rendering engine 628. Environment rendering engine may use known two dimensional and three dimensional rendering methods to calculate a virtual environment for the predictive virtual personification. For example, the virtual environment may be a movie set, buildings, a baseball fields, a stage, or other environments in which the predictive virtual personification is meant to interact. The environment rendering engine may render the environment using archived image data from a real world environment and using known computer graphic imaging (CGI) methods. In some embodiments, environment rendering engine does not calculate a virtual environment, but instead receives video and audio data from a real environment and communicates that data to the PVP rendering engine such that the predictive virtual personification may interact in a real environment. In some embodiments, multiple, distinct predictive virtual personifications taken from different subjects may interact within a single environment.

The system may also include AV output device 640. For example, AV output device may be a digital video converter configured to store digital video to a storage media. AV output device may also be an AV projector, or a holographic image projector to project a predictive virtual personification into a real environment using a hologram or video projection. AV output device may also be a digital media screen, such as a video monitor, TV monitor, mobile device display, or other display. AV output device may also be a social media network, such that a predictive virtual personification may be uploaded to a user's social media page.

The system may also include user input device 650. The user input device may enable a user to input predictive virtual personification parameters to facilitate the generation of the predictive virtual personification. For example, user input device may be a computer console, a mobile device, a tablet device, or other input device. A user may use the user input device to input parameters such as stimulus event maps that include the time of a stimulus event and/or the time of active response to the stimulus, correlation with an SROI-specific saliency map. The input parameters may also include labels, descriptions, and all types associated with specific stimulus events. For example, types of stimulus events and categories such as reactions to approaching objects, responses to audio cues, reactions to stationary visual cues, etc. Labels may include identification of specific stimulus events such as swinging back at an oncoming baseball, swing a golf club at a stationary golf ball, approaching or grabbing a stationary microphone stand in preparation of starting a song, reaction to loud applause, etc.

Any stimulus event in which a donor subject interacts with an environment may be incorporated into the system through the capture of applicable saliency data, correlation of the stimulus event with a plurality of SROI-specific saliency maps, and categorization of the stimulus with a label, description, and type. In some embodiments, saliency recognition engine 622 may automatically recognize and/or suggest one or more labels, descriptions, and types for an observed stimulus event based on automatic recognition of saliency patterns within one or more observed SROI's. For example, saliency recognition engine 622 may observe an SROI encompassing a subjects hand throwing a baseball, match the saliency pattern observed to a known saliency pattern of a baseball being thrown, and a label the stimulus event accordingly.

Figure 7:
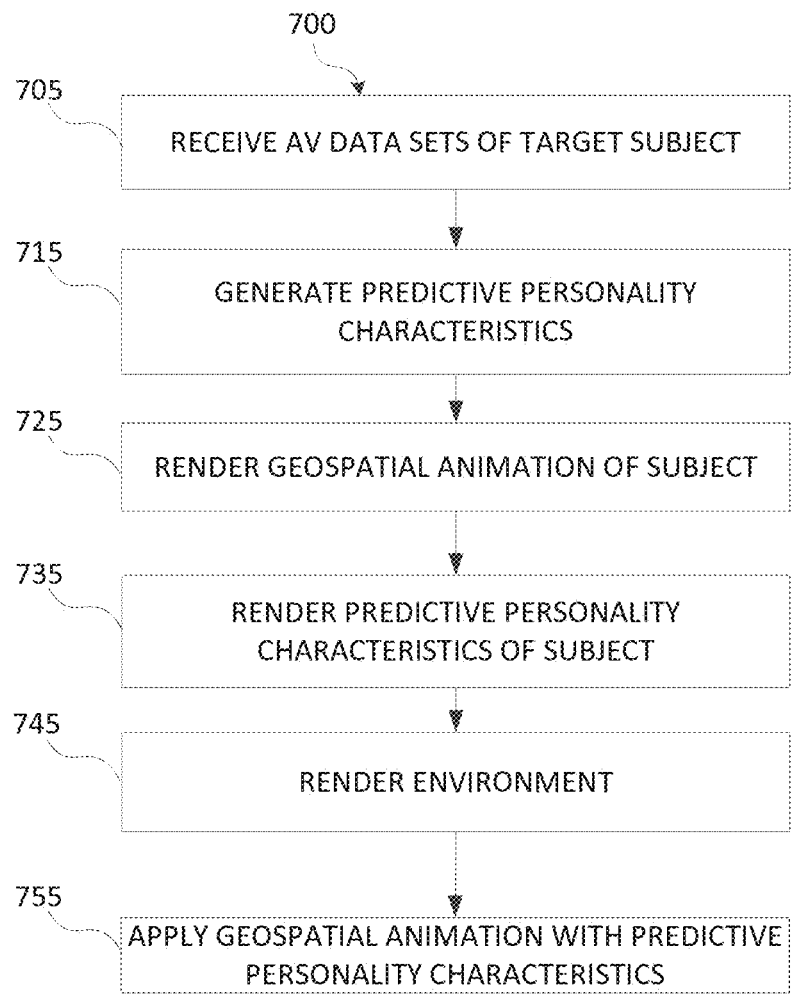
FIG. 7 is a diagram illustrating a method for generating a predictive virtual personification, consistent with embodiments disclosed herein.

FIG. 7 is a diagram illustrating a method for generating and using a predictive virtual personification. The method includes receiving one or more audiovisual (AV) data sets of a donor subject at step 705. For example, the AV data set could be real-time capture from any of the AV data sources described with respect to FIG. 6 above, as well as historical AV data sets. The AV data sets will be associated with a donor subject performing a specific task, or reacting to a stimulus event. The stimulus event may be an external stimulus event, such as it approaching baseball, it approaching automobile, and anticipated physical contact by another person, or any other external stimulus events disclosed herein, or that would be known to one of ordinary skill in the art. This is event may also be an internal stimulus event, such as a decision to perform a task. For example the task may be swing a golf club at a golf ball, or approaching a microphone to sing, or any other volitional task in which the subject might participate.

The method for generating and using a predictive virtual personification also includes generating a set of physio-emotional characteristics at step 715. For example, the saliency server may generate the set of physio-emotional characteristics as one or more SROI specific saliency maps, consistent with the methods disclosed herein. The method for generating and using a virtual personification may also include rendering a geospatial animation of the subject at step 725. For example, historical geospatial imaging of the donor subject taken from multiple perspectives may be compiled within PVP rendering engine 626. PVP rendering engine 626 may then use known CGI rendering methods to generate either a two-dimensional or three-dimensional animation of the donor subject. In some embodiments, the animation of the donor subject may be a realistic depiction of the donor subject. In other embodiments, the animation of the donor subject may be a cartoon of the donor subject, or an altered version of the donor subject.

The method for generating and using a predictive virtual personification may also include rendering physio-emotional characteristics of the subject at step 735. For example, the physio-emotional characteristics associated with a donor subject may be stored in data store 630. These physio-emotional characteristics are correlated SROI specific saliency maps associated with various stimulus events. Data store 630 may also store a database organizing various stimulus events by label and type. In some embodiments, the saliency data collected from the donor subject may only relate to a subset of the available stimulus event types and/or labels known to the predictive virtual personification system. However, PVP rendering engine 626 may extrapolate the correlated SROI specific saliency maps generated from the AV data sets of the donor subject to create rendered SROI specific saliency maps that cover a complete set of probable stimulus events. For example, PVP rendering engine 626 may compare correlated SROI specific saliency maps for one donor subject in reaction to a subset of stimulus events to other subjects reaction to the same types of stimulus events to identify closely matching profiles, and differences within those profiles between the one donor subject and the other subjects. The PVP rendering engine may then use those differences to extrapolate to the one donor subject a complete set of rendered SROI specific saliency maps for stimulus event data collected from the other subjects. Accordingly, PVP rendering engine 626 may either recall, or calculate on-the-fly a set of rendered SROI specific saliency maps approximating how a donor subject would react to any of the stimulus events and/or stimulus event types known to the predictive virtual personification system.

In some embodiments, more than one set of correlated SROI specific saliency maps will be captured and stored for a specific stimulus event. Thus, a donor subject may react differently, with some slight variances to a specific stimulus event. The rendering of the physio-emotional characteristics may also include applying a Bayesian probability function to determine which set of correlated SROI specific saliency maps to apply in response to a specific stimulus event, in light of the historic response pattern a donor subject may have had to similar stimulus events.

Rendering the physio-emotional characteristics of the subject at 735 may also include adapting correlated and/or rendered SROI specific saliency maps using a CPF function. For example, as a donor subject is repeatedly exposed to the same stimulus event, the donor subject's natural reaction estimates of may change. For example, the speed of any reaction to the stimulus event may increase such that a pattern linking any preprocessing and/or preplanning by the donor subject in relation to the donor subject active response to the stimulus event may become more predictable, more repeatable, and faster, following a CPF function. Thus, the CPF function may be applied to the rendered or correlated SROI specific saliency maps, increasing the probability that any given map may be applied in response to a specific stimulus event, in fact altering that map by shortening the time between stimulus event and active response.

The method for generating and using a predictive virtual personification may also include rendering environment at step 745. For example, the environment may be any setting applicable to the donor subject. For example, the environment could be a baseball field, a golf tee box, a stage of the music concert, a couch in the living room, or any other place that a person might find himself or herself. Environment rendering engine 628 may use known CGI methods to render the environment based on historical AV data of similar environment stored in data store 630. Alternatively, in some embodiments, environment rendering engine 628 renders an environment based on real-time AV data sets being captured through AV source 610 such that a real-time environment may be provided to the predictive virtual personification.

The method for generating and using a predictive virtual personification may also include applying the geospatial animation of the donor subject with the physio-emotional characteristics at step 755. For example, the predictive virtual personification may be rendered within the rendered environment and exposed to one or more stimulus events. As saliency recognition engine recognizes the stimulus events, or the stimulus events are either pre-populated or populated in real time into the PVP server through the user interface, the PVP rendering engine can predict how the donor subject would have reacted to the stimulus event, and may apply a set of rendered SROI specific saliency maps to animate the predictive virtual personification within the rendered environment. In cases where the rendered environment is drawn in real time from a real environment, the predictive virtual personification may be projected into the real environment through AV output device 640. In cases where the rendered environment is generated from historical or animated data sets, both the rendered environment and predictive virtual personification may be output through AV output device 640.

Figure 8:
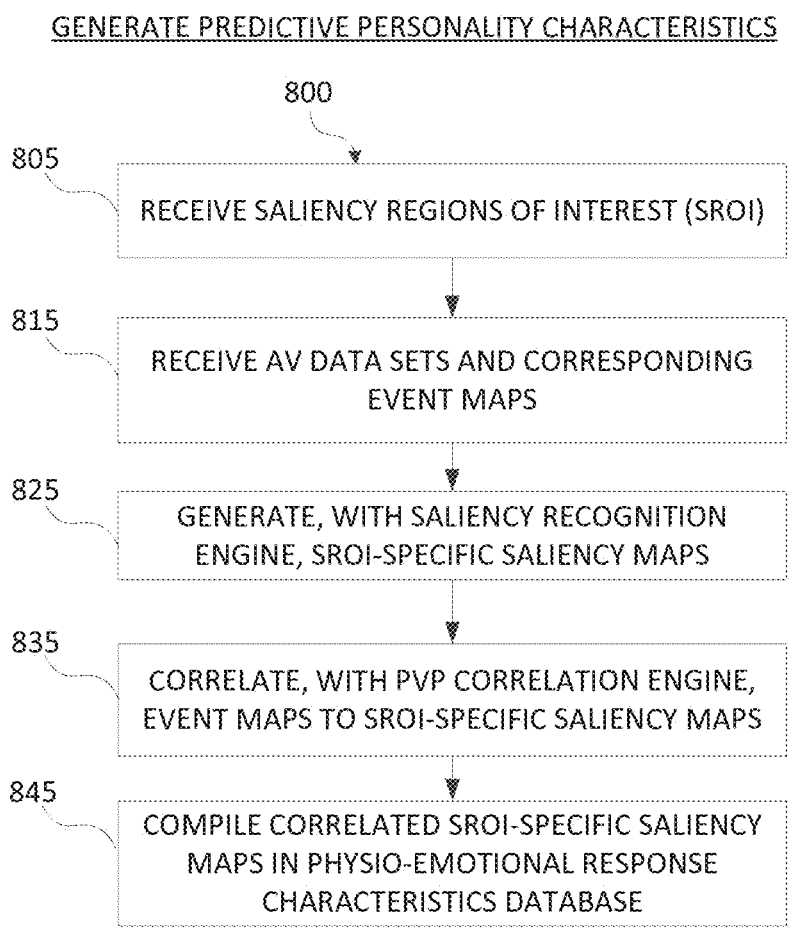
FIG. 8 is a flow chart illustrating a method for identifying and storing a donor subject's physio-emotional characteristics, consistent with embodiments disclosed herein.

FIG. 8 is a flow chart illustrating a method for identifying and storing a donor subject's physio-emotional characteristics. For example, the method for identifying and storing the donor subject's physio-emotional characteristics may include receiving saliency regions of interest (SROIs) at step 805. The SROI's may be any visually or auditorily observable feature of the donor subject that may exhibit observable characteristics, whether macro or micro, in response to the stimulus event. For example, the SROI may be a donor subject's brow, and the observable characteristic may be a twitch or formation of a bead of sweat in response to concentrating on an oncoming baseball pitch. In another example, the SROI may be a donor subject and the observable characteristic may be rapid blinking in response to a decision to walk out onto a stage in front of an audience. The SROI may be auditory as well, for example, the change in the pitch of a donor subject's voice in response to big asked a question to which the donor subject does not know the answer.

The number of possible SROI-stimulus event pairs is vast. However, embodiments of this disclosure may use a subset of SROI-stimulus event pairs, and categorize the stimulus events by type to enable extrapolation by PVP rendering engine 626 according to methods disclosed herein. Accordingly, PVP rendering engine 626 may extrapolate a donor subject's anticipated reaction to similar types of stimulus events based on the donor subject's reaction to an actual stimulus event of the same type. Moreover, the receiving saliency regions of interest at step 805 may include receiving previously un-catalogued saliency regions of interest has to expand an SROI library. Just as with stimulus events, each new SROI may include a label, a description, and a type, wherein the type may indicate a genus or category of SROI. For example, the type of SROI may include SROI's within the subjects face and the species SROI's may include the cheek, the brow, the eyelid, the mouth, etc.

The method for generating physio-emotional characteristics may also include receiving AV data sets and corresponding event maps at step 815. For example, the AV data sets may be any of the data sets generated by AV data source 610 is disclosed herein. The event maps may be time lines indicating the time of the stimulus event, and the corresponding time of an active response by the donor subject.

For some stimulus events, the stimulus event time and the active response time may both be observable, and thus the event that may be automatically calculated. For example, the stimulus event could be an oncoming baseball pitch, the SROI could be the donor subject's hand, and the active response could be moving the hand in such a fashion as to the bat towards the oncoming pitch. For other stimulus events, either of the stimulus event time or the active response time may not be observable. For example, the stimulus event may be an internal decision to walk towards a microphone and begin to sing a song. In such a case, the active response will be walking towards the microphone, but the seamless event, the actual decision, may not be visually observable. However, an event map may be manually entered indicating the time that the stimulus event took place, or in some cases, the stimulus event may be observable through the use of other imaging modalities. For example, an event that may be captured using functional brain imaging to identify when the stimulus event took place.

The method for generating physio-emotional characteristics may also include generating, with the saliency recognition engine, SROI specific saliency maps at step 825. Generating a SROI specific saliency map may include identifying one or more SROI's using saliency recognition and/or pattern recognition methods. For example, identifying a moving cheek within AV data set may include recognizing the pattern of the cheek, and/or identifying of the cheek with respect to the background. In some embodiments, ultrahigh resolution, or ultrahigh frame rate cameras may be used to capture very fast and/or very small movements at an SROI. The SROI specific saliency map, then, may be a plot in one or more spatial dimensions illustrating the movement of the SROI, or one or more the pixels/voxels therein, with respect to time. Multiple SROI specific saliency maps may be captured for a single SROI, as well as for a plurality of SROI's, and stored in data store 630.

The method for generating physio-emotional characteristics may also include correlating, with a PVP correlation engine, the event maps to the SROI specific saliency maps at step 835. Accordingly, each SROI specific saliency map may be converted to correlated SROI specific saliency map in which both stimulus event time and active response time identified on the map. In some embodiments, the stimulus event time or the active response time may be visually observable or apparent within one SROI specific saliency map, but not within a matter SROI specific saliency map. For example, the stimulus event of an oncoming baseball pitch may be observable at an SROI of the donor subject's brow that raises and lowers multiple times is a better prepare swing at the pitch. But then, as a better actually swings at the pitch the SROI of the hands moving will clearly indicate the active response of swinging, but the brow may not move. Thus, the PVP correlation engine cross correlate SROI specific saliency maps to extrapolate full event maps from one SROI specific saliency map to another. This type of extrapolation is illustrated in the description of FIG. 10 below.

The method for generating physio-emotional characteristics may also include compiling the correlated SROI specific saliency maps within a physio-emotional response characteristics database at step 845. The physio-emotional response characteristics database may be stored in data store 630, and may provide an archive of correlated and rendered sets of SROI specific saliency maps for a given donor subject in response to a set of stimulus events and stimulus event types.

In some embodiments, the PVP rendering engine 626 may employ a learning algorithm to analyze correlated SROI specific saliency maps and learn a donor subject's physio-emotional characteristics over time. For example, the donor subject's physio-emotional characteristics may be dynamic and change based on learned traits through interaction with one or more environments (either rendered or real). PVP rendering engine may use a deep learning algorithm to organize and parse a set of correlated SROI specific saliency maps to determine a donor subject's likely response to different types of stimuli. For example, in one embodiment, the deep learning algorithm may calculate deep neural networks based on the correlated SROI specific saliency maps using statistical probability functions relating types of stimuli to predicted responses. PVP rendering engine 626 may also use a renormalization group process, using the SROI specific saliency maps as inputs, to determine a donor subject's likely response to different types of stimuli. These same virtual learning techniques, as well as others known in the art, may be applied to the PVP rendering engine, as well as other modules of PVP server 620, such as saliency recognition engine 622, PVP correlation engine 624, and environment rendering engine 628.

Figure 9:
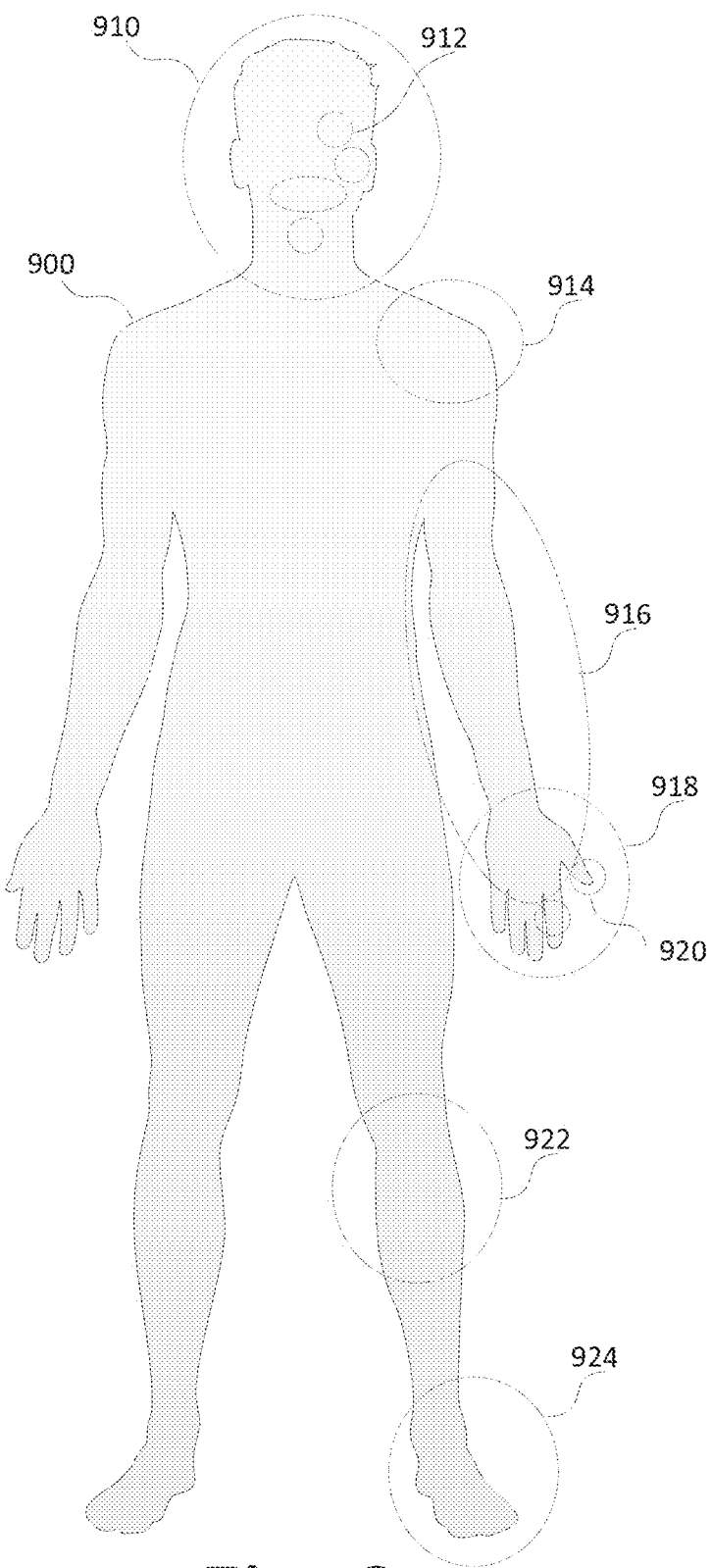
FIG. 9 is a diagram illustrating an example set of saliency regions of interest within a donor subject, consistent with embodiments disclosed herein.

In one embodiment, organizing and parsing a set of correlated SROI specific saliency maps to determine a donor subject's likely response to different types of stimuli may be framed as an unsupervised learning problem. Accordingly, the PVP server 620 may employ a deep learning algorithm to interpret the unlabeled data. For example, a single donor subject may have many SROIs, ranging from a few as illustrated in FIG. 9, to hundreds, thousands, or millions. Each SROI may be evaluated many times to create many SROI specific saliency maps (e.g., tens, thousands, millions, or hundreds of millions of SROI specific saliency maps per SROI), which in turn may be correlated to many, if not all of the other SROI specific saliency maps. Given the large size of this data set, using unlabeled data to enable a deep learning data analysis may be efficient.

In addition, deep belief networks may provide deep structure that can be trained in an unsupervised manner, e.g., using neural networks that are partially trained by unsupervised learning. Data processed using this deep learning algorithm may be depicted in a distributed representation. The distributed representation to observe data (i.e., relationships between the correlated SROI specific saliency maps over time as a function of the subject donor's physio-emotional state (i.e., a mood, level of rest, level of stress, performance, etc.), as well as a trigger stimulus event. Interactions of many different factors may be represented and abstracted through a multi-layer deep learning analysis. As such, a set of historical SROI specific saliency maps, illustrating geospatial movements for each of a plurality of preselected SROIs (i.e., observable features of a donor subject) may form a historical saliency map space that includes multiple dimensions, including a trigger stimulus dimension (e.g., a set of historical SROI specific saliency maps that correlate to specific types of trigger stimuli), as well as physio-emotional characteristics such as mood, stress level, health, rest state, performance, etc. The historical saliency map space may also include a time dimension and a CPF dimension, such that a donor subject's observable reactive response to a particular trigger stimulus event, or type of trigger stimulus event, may change over time in correlation to a CPF, as the reactive response becomes learned or forgotten. As such, a renormalization group transformation may be applied to the historical saliency map space to transform the historical saliency map space to a predictive saliency map space. Then, from predictive saliency map space, a particular set of predictive SROI specific saliency maps may be extrapolated by selecting a trigger stimulus event, physio-emotional state or characteristic, or other parameters/dimensions as defined in the predictive saliency map space.

For example, the deep learning algorithm may actually comprise a set of algorithms (e.g., non-linear transformations) to model high-level abstractions in the data using model architectures and/or neural networks that can learn and recognize patterns, such as pattern recognition algorithms as known in the art. One example algorithm employed by the PVP Server 626 is a deep learning algorithm that employs variational renormalization groups that can operate on structured and unstructured data sets.

Context or context aware computing for purposes of this invention can be programed to sense the physical environment of the donor, and adapt the donor's behavior accordingly. Context-aware systems are a component of a ubiquitous computing or pervasive computing environments. Three important aspects of context are: who the donor is, where the donor is; who is the donor with; and what resources are available. Although location is a primary capability, location-awareness does not necessarily capture things of interest that are mobile or changing. Context-aware can include nearby people, devices, lighting, noise level, network availability, and even the social situation. Context awareness can be developed using the key programing elements defined and referred to herein to develop, identify and to integrate key elements, such as environments, situational statuses, donor self and predictive awareness of and by the donor.

FIG. 9 is a diagram illustrating an example set of saliency regions of interest within a donor subject. The SROI's illustrated are just an example of the possible SROI's that may be tracked. As illustrated, a genus of SROI's, 910, may be located within a donor subject's facial area, including species SROI's 912 (the eye lid, cheek, mouth, neck, etc.). Similarly, another genus of SROI's, 916, may be located within a donor subject's arm, including hand 918 and fingers 920. Other SROI's may be tracked, as would be appreciated by one of skill in the art.

Figure 10A:
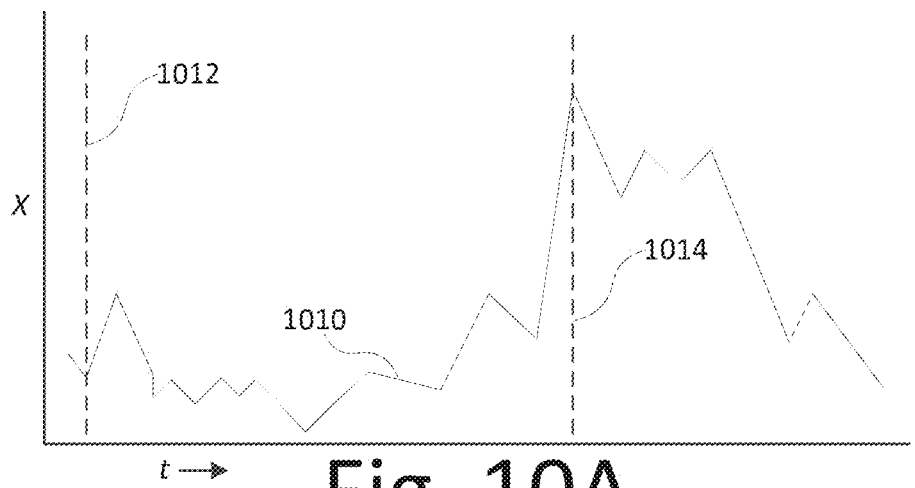
FIG. 10A is a chart illustrating a relationship between movement in one dimension of a saliency region of interest as correlated with a stimulus event and a corresponding action event, consistent with embodiments disclosed herein.
Figure 10B:
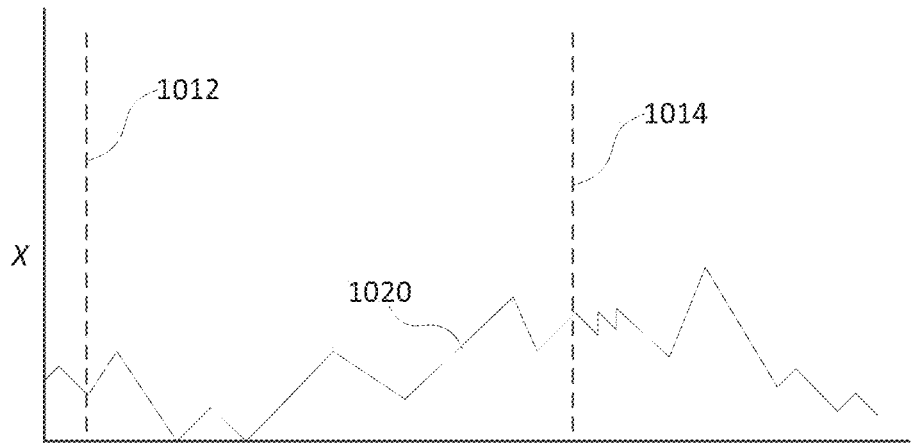
FIG. 10B is a chart illustrating a relationship between movement in one dimension of a saliency region of interest as correlated with a stimulus event and a corresponding action event, consistent with embodiments disclosed herein.
Figure 10C:
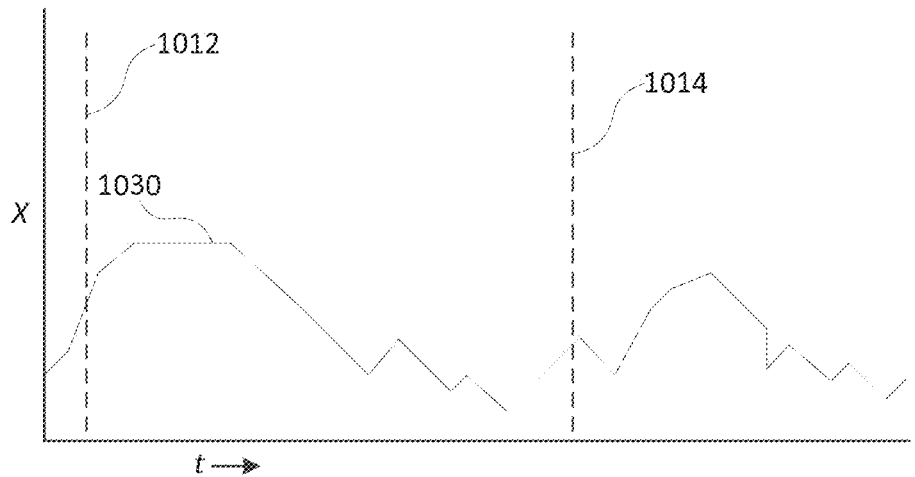
FIG. 10C is a chart illustrating a relationship between movement in one dimension of a saliency region of interest as correlated with a stimulus event and a corresponding action event, consistent with embodiments disclosed herein.

FIGS. 10A-10C are charts illustrating a relationship between movement in one dimension of multiple saliency regions of interest as correlated with a stimulus event and a corresponding action event. For example, FIG. 10A illustrates movement along the x-axis for an SROI over a given time period, t. Thus, plot 1010 shows movement following a stimulus event at time 1012 culminating in a larger movement that active response time 1014. Stimulus event time 1012 and active response time 1014 make up an event map that is correlated to this SROI specific saliency map. Using a high frame rate camera, and/or a high-resolution camera, small and fast movements, jitters, or micro-movements may be tracked between the stimulus event and active response.

Thus, for a given SROI, a donor subject's habitual movements and reactions leading up to an actual active response may be observed correlated with the stimulus event. The same map then may be applied to predict either how a donor subject will react to a similar stimulus event in the future, or to identify what a stimulus event was that may have caused a particular reaction. Moreover, other physio-emotional parameters may be compiled correlated with each SROI specific saliency map, such as, a donor subject's emotional state. For example, multiple as ROI specific saliency maps may be compiled for a donor subject deciding to start singing a song into a microphone, but for some of the maps, the subject may be nervous, upset, angry, happy, sad, etc. each of these emotional states may be entered via user input upon a first data collection, but may later be identified by matching the captured SROI specific saliency map with a previously observed SROI specific.

Moreover, the subjects emotional state may be incorporated into a predictive virtual personification, such that the predictive virtual personification's anticipated responses to any given stimulus event may depend upon the current emotional state of the predictive virtual personification. This emotional state may be entered through a user interface, hardcoded into the project virtual personification, participated in response to previous stimulus events.

FIGS. 10B and 10C illustrate SROI specific saliency maps 1020 and 1030, respectively, captured for different SROI's, but under the same stimulus event 1012 as illustrated in FIG. 10A, and culminating in the same active response 1014. As demonstrated, the stimulus event may be more easily observable and one SROI specific saliency map from another, as may the active response. However, the event map of times 1012 and 1014 may be correlated across each SROI specific saliency map compiled from data captured by observing each discrete SROI.

In some examples, a predictive virtual personification may be generated and populated into a real or virtual environment. During interaction with that environment, AV data may be captured, and the processes disclosed herein for analyzing and creating a predictive virtual personification may be run for a second time, to create a second derivative predictive virtual personification. Through the addition of new stimuli and user input, multiple derivative virtual personifications may be generated, each engineered to behave slightly differently based on experiences and learning during exposure to real or rendered environments. For example, a first level virtual personification may be based on a donor subject that speaks English and conforms with American culture. That virtual personification may be exposed to French language and culture in a rendered or real environment. The new language and behavior sets may be adopted by the first level virtual personification over time. A second level virtual personification may then be captured, either from the original donor subject, or from the first level virtual personification. This process could be repeated such that a single donor subject may have many virtual personifications that learn different behaviors based on the environments in which those virtual personifications interact. The same principles for learning, disclosed herein, may be applied to those derivative virtual personifications, just as they were applied to the original donor subject. As such, the derivative virtual personifications may each have the same root behavioral characteristics, but actual expressions and behaviors may vary, just as they might, for example, for genetically identical twins that are exposed to different environments.

Embodiments of this disclosure combine and correlate AV data of a donor subject (e.g., a human subject) to the donor subject's neural activity, including behavioral end emotional states and reactions to stimuli. Some embodiments analyze cognitive plasticity and compare that analysis with a donor subject's observable actions. AV data sets may be gathered and analyzed, and then compiled and/or rendered into a predictive function capable of virtually anticipating a donor subject's behavior and emotional states. As used herein, consciousness means the quality or state of awareness, or, of being aware of an external object or something within oneself. For example, sentience, awareness, subjectivity, the ability to experience or to feel, wakefulness, having a sense of selfhood, and the executive control system of the mind.

Some embodiments of the disclosure provide a method for training a neural pathway. An example method of training a neural pathway may include capturing, with a geospatial imaging modality, one or more geospatial imaging data sets, capturing, with a neuro-cognitive imaging modality, one or more neuro-cognitive imaging data sets, and applying a stimulus. The method may further include calculating, with a computer processor, a stimulus specific cognitive plasticity factor (CPF) and re-applying the stimulus.

Some of the detection devices and methods disclosed herein rely on physically observable signaling of a human subject that is linked to a "readiness potential." As used herein, a readiness potential is a non-volitional component of a donor subject's volitional responses, actions, or movements. For example, a generally repeatable, subject-unique physical movement or set of movements will typically precede a donor subject's volitional response, action, or movement. That is, before a donor subject executes a conscious decision to move, muscles in the body will have already started flex. This phenomenon is a pre-cognitive function referred to herein as a readiness potential, and in many cases can be visually observable, albeit high resolution and/or high frame rate video capture equipment may be required. And, the CPF, as disclosed herein, may affect the length of the time-frame in which the readiness potential is observable for a particular subject and action.

For example, initial neural signaling related to a reaction, response, or decision to act or move can drive from other parts of the brain to the premotor cortex and the motor cortex, where detailed instructions to flex specific sets of muscle fibers are generated and transmitted down the spinal cord and to the related muscles. In many cases, a decision to move occurs prior to the individual becoming cognitively aware of the decision or how to execute the decision. The actual volitional (or non-volitional, as the case may be) action is pre-determined in the motor cortex without requiring the individual to develop, or think about the specific instructions. For example, an individual does not typically think about which muscle fibers to flex in the leg to make the leg move forward and walk—instead, the individual just decides to walk. The individual may be even less aware of the readiness potential—but nevertheless, the body may still react during the readiness potential time-frame through twitches, eye-blinks, brow raises, breathing cadence changes, quivers, micro-movements, etc. Many of these movements will be physically observable during a short period of time between when the individual decides to act (or reacts to a stimulus) to the time that the actual active response occurs.

As describe the CPF is a measure of precognitive, awareness, and consciousness functions including the readiness potential described above. As may be understood to some of skill in the art, neural activity during the readiness potential period, and even prior to the readiness potential period is the result of neurochemical processes, and affected by interactions of molecules, and even atoms, on a quantum level. The neural activity that occurs during this readiness potential time frame can be observed using neural imaging, functional imaging, and/or audiovisual imaging of a donor subject. For example, physical movements, caused by the neural activity during the readiness potential period may be observable by high frame rate, high resolution, ultrahigh frame rate, and/or ultrahigh resolution video capture equipment. This observable movement map may reflect how an individual donor subject reacts to any variety of stimuli, including internal stimuli that themselves are not observable (e.g., decisions made internally by the donor subject).

Each donor subject's neural staging processes, of which the readiness potential is one, activates specific neural circuits and synapses. Embodiments disclosed herein are directed at detecting these processes through indirect observation (i.e., by observing outward physical movements) to identify subject-dependent "hyper temporal" plasticity and related hyper temporal preparation states.

For example, this hyper temporal, early temporal, mid temporal, and later temporal preparation and initial execution states can be from a few milliseconds to over 500 milliseconds and those when optionally separated and analyzed can be combined with other identifiable forms of the subjects physical anatomy in both microscopic and macroscopic levels.

The movement map may also be unique to the individual donor subject, and may vary slightly based on environmental parameters, as well as based on internal parameters such as the donor subject's emotional state. For example, an angry donor subject may behave differently than a happy donor subject. In either case, a compilation of movement maps for any specific individual target will be unique to that donor subject, just like a finger print. These observable movements and tendencies during the readiness potential period are also recognizable to third-parties and help define a person's "essence." The outward appearance of individual's movements, actions and activities is the direct reflection of the individual's internal consciousness. Similarly, changes in these observable movements in response to the same or similar stimuli may indicate learning, or may be used to diagnosis developmental, psychological, or mental disorders. These movements can be observed, and predictably recreated using some of the embodiments disclosed herein.

Cortical organization, especially for the sensory systems, is often described in terms of cortical maps. One of the fundamental principles of how neuroplasticity functions are linked to the concept of synaptic pruning, the idea that individual connections within the brain are constantly being removed or recreated according to how the neurons are used. If there are two nearby neurons that often produce an impulse simultaneously, their cortical maps may become one. This idea also works in the opposite way, i.e. that neurons that do not regularly produce simultaneous impulses will form different maps. When a reaction to a stimulus event is cognitively associated with reinforcement, its cortical representation is strengthened and enlarged. This effect is measurable through the CPF defined herein.

For example, the recognition of faces is an important neurological mechanism that an individual uses every day. Faces express a significant amount of information that guides our social interactions, reactions, and emotions that play a large role in our social interpretations and interactions. The perception of a positive or negative emotion on a face can significantly affect the way that an individual perceives, processes and reacts to that face. For example, a face that is perceived to have a negative emotion can be processed in a less holistic manner than a face displaying a positive emotion. The neurological mechanisms responsible for face recognition are present by age five. Research shows that the way children process faces is similar to that of adults, but adult's process faces more efficiently. The reason for this has been attributed to advancements in memory and cognitive functioning that occur with age.

Some embodiments disclosed herein detect saliency, and saliency patterns. A saliency recognition engine may be used to find, recognize, and track salient regions of interest (SROI) within a donor subject. In some examples, a wide field of view capture device may be used in conjunction with a saliency recognition engine to monitor more pixels at the same time. High speed processing within the saliency recognition engine, may be required in connection with high frame rate and ultrahigh frame rate cameras to detect SROI's in real time.

As used herein, an event-related potential (ERP) is the measured brain response caused by a sensory, cognitive, or motor event within a donor subject. For example, it is any stereotyped electrophysiological response to a stimulus. Some embodiments may be directed towards detecting an event related potential (ERP) component elicited in the process of decision making. The may reflect processes involved in a donor subject's stimulus evaluation or categorization. For example, the ERP may be recorded by electroencephalography (EEG), as a positive deflection in voltage with a latency (delay between stimulus and response) of roughly 250 to 500 ms. The signal is typically measured most strongly using electrodes that cover the parietal lobe. The presence, magnitude, topography and timing of this signal may be used to characterize a cognitive function involved in a donor subject's decision making processes. An ERP may also be measured using MEG. For example, in some embodiments, a donor subject may be exposed to the same stimulus event repeatedly, and MEG and EEG data may be captured to characterize an ERP response to the stimulus. This may be repeated for many stimuli to characterize a set of ERP curves unique to that individual. The data may be correlated with captured AV data to correlate external movements with the ERP wave.

Wide amplitude noise (such as eye blinks or movement artifacts) are often several orders of magnitude larger than the underlying ERPs. Therefore, trials containing such artifacts should be removed before averaging. Artifact rejection can be performed manually by visual inspection or using an automated procedure based on predefined fixed thresholds (limiting the maximum EEG amplitude or slope) or on time-varying thresholds derived from the statistics of the set of trials.

Compared with behavioral procedures, ERPs provide a continuous measure of processing between a stimulus and a response, making it possible to determine which stage(s) are being affected by a specific experimental manipulation. Another advantage over behavioral measures is that they can provide a measure of processing of stimuli even when there is no behavioral change. However, because of the significantly small size of an ERP, it may take a large sample size to accurately measure it correctly. ERPs provide temporal resolution of 1 ms or better. However, the spatial resolution for fMRI or PET exceeds the spatial resolution for ERP.

An alternative approach to saliency recognition, as described above, is premised on "pure surprise" is to use a full surprise algorithm. Full surprise algorithms employ additional processing on the features in each frame of the video and create statistical models that describe the scene. If anything unexpected happens, the surprise algorithm is able to return the location of the happening. A Bayesian framework may be used to calculate a saliency map. Such an algorithm may use the KL distance between the prior and posterior as the measure of surprise. Because it takes the entire history of the scene into account, it exhibits a much lower false alarm rate than that of a system that exclusively uses saliency. One of skill in the art would appreciate that other saliency recognition engines may be used.

In some embodiments, characteristics are captured and correlated defining a donor subject's body-brain-mind (BBM) from AV, neural, and/or functional imaging data sources. For example, anatomical imaging includes using available historical records of the donor subject and/or real-time data capture of salient elements of the donor subject and/or close family members. The developing of general, and or detailed and complete image captures of uniquely identified and specific anatomical, biological, neurological detailed targets of the subject can take place in either real time or from historical imagery data bases, including complete anatomical, medical, and neural/consciousness cognitive data captures. For example, CT scans, MRI, MEG, Ultrasound imaging of targeted specific anatomical features and overviews of the subjects unique feature and functional elements. This data can then be analyzed and/or combined for incorporation into broadcast ready materials content.

In some examples, temporal or time-stamped historical references are combined with the real-time developed predictive virtual personification. The historical data may also or alternatively be combined with data captured from a similar, or related "stand in" subject who may emulate the donor subject. The data may then be reconstructed and rendered into personality and behavioral characteristics engrained in a virtual representation/likeness of the donor subject—a predictive virtual personification—such that the predictive virtual personification can interactively work, think, move and act in optionally the same, similar or anticipated forms of the designated individual human being in the virtual electronic world on demand. The predictive virtual personification may interact within a video, film, television, real world environment, or social media environment. In some embodiments, the predictive virtual personification may be used in a medial environment for administering therapy to a loved-one related to the deceased donor subject. In other embodiments, the predictive virtual personification may serve as a way that distant relatives can interact more closely and more often within a social media site, or using display and image capture capabilities on a mobile device, for example.

Figure 11:
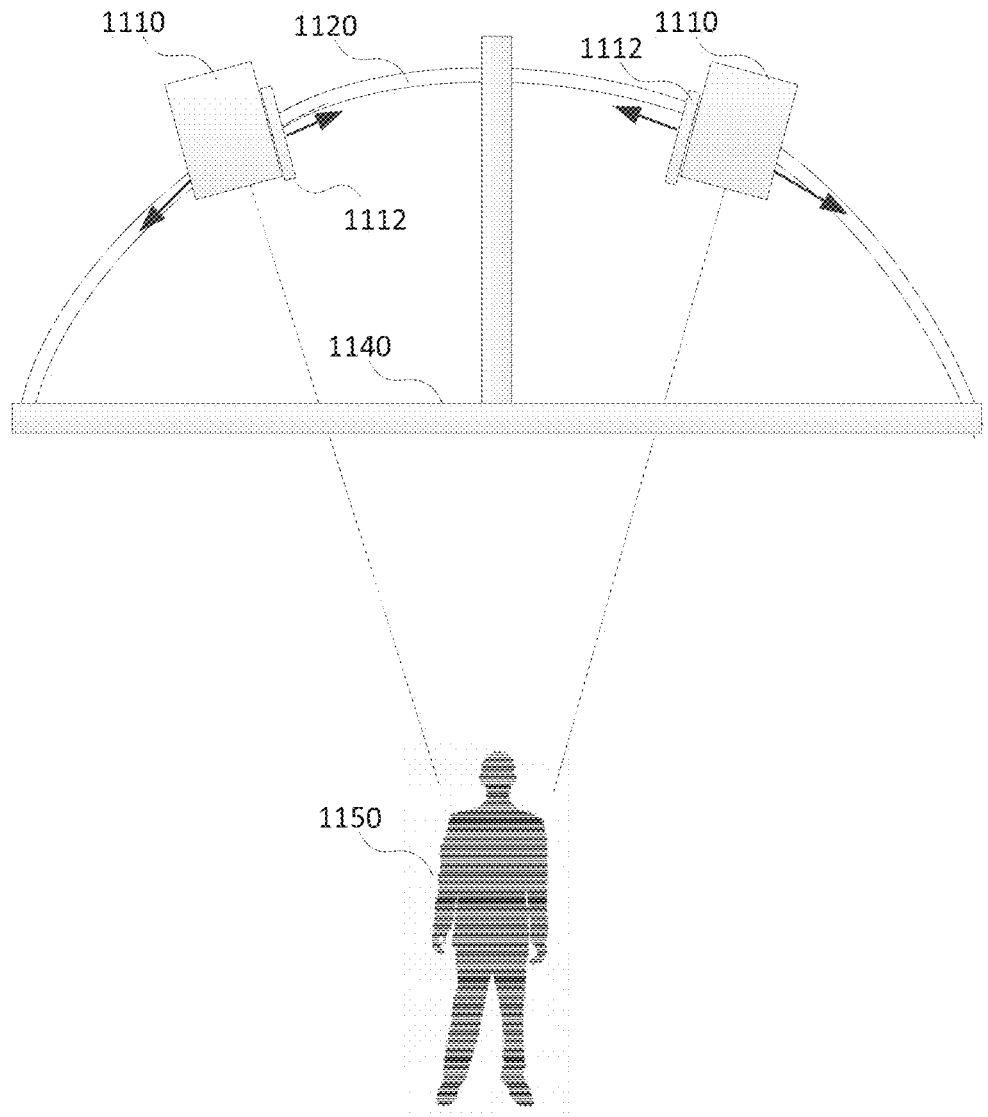
FIG. 11 illustrates an example an audio-visual (AV) data capture device, consistent with embodiments disclosed herein.

FIG. 11 is a diagram illustrating an example of an AV data capture device used to capture data used to generate a first level virtual personification from a donor subject. The AV capture device may include digital video cameras 1110 mounted on rail 1120. For example, the digital video cameras may be standard digital video cameras available in the field. In some examples, digital video cameras 1110 are high frame rate, high resolution, ultrahigh frame rate, and/or ultrahigh resolution cameras. In some examples, digital video cameras 1110 may incorporate laser imaging systems, including interferometric systems. Digital video cameras 1110 may be positioned on rail 1120 such that they are aimed at donor subject 1150. Digital video cameras 1110 may also be repositioned and locked in place in any position along rail 1120 such that varying angles and perspective fields of view are possible. The separation of video cameras 1110 along rail 1120 enables capture of different perspective angles of the same donor subject at the same time, enabling 3D image reconstruction. Digital cameras 1110 may also be mounted on rail 1120 using motorized servos, or other automated technology to automatically reposition to the cameras to different locations along the rail. The video cameras also include audio capture devices 1112. Audio capture devices 1112 may be standard audio microphones, or may be directional microphones, or high amplification microphones. Rail 1120 is mounted on support structure 1140, which may be oriented in a different plane from rail 1120 such as to avoid interfering with the field of view of video cameras 1110. This AV device is illustrated for exemplary purposes only. One of ordinary skill in the art would appreciate that many other AV capture devices may be used.

In one example data capture system consistent with embodiments disclosed herein, a heart rate variability (HRV) sensor is included. HRV data captured using the HRV sensor may be correlated with other data (e.g., AV data, SROI specific saliency maps, CPF, etc.) to further identify patterns relating to predictable biophysical behaviors of a donor subject. For example, the sympathetic and the parasympathetic nervous system control the speeding up and slowing down for optimum cardiovascular activities. Thus, HRV may be measured and analyzed in comparison to EEG data using correlation analysis algorithms disclosed herein (e.g., a deep learning algorithm). Using HRV in concert with the other data capture technologies disclosed herein, a PVP server (i.e., PVP server 626 from FIG. 6) can determine, analyze, and store a donor subject's activity state emersion status, adaptive flexibility, innovation status and degrees, physio-emotional characteristics, controlled actions and discipline, cognitive functions and cognitive awareness, environment and situational awareness, stress levels, and the changes to each parameter in response to a trigger stimulus. Given that the cardiovascular system, and the heart specifically, is closely connected to the brain from a neurological perspective, HRV data can add an added dimension to identifying and predicting behavior of a donor subject. By repeating this process over a wide range of conditions such as time, space or environments, and donor's variability's and exposure factors to stimuli and emotional states the donor's individual biophysical and cognitive signatures (e.g., a CPF) can be analyzed, stored, archived, and associated with a virtual representation of the donor subject (e.g., a rendered animation of the donor subject).

Figure 12:
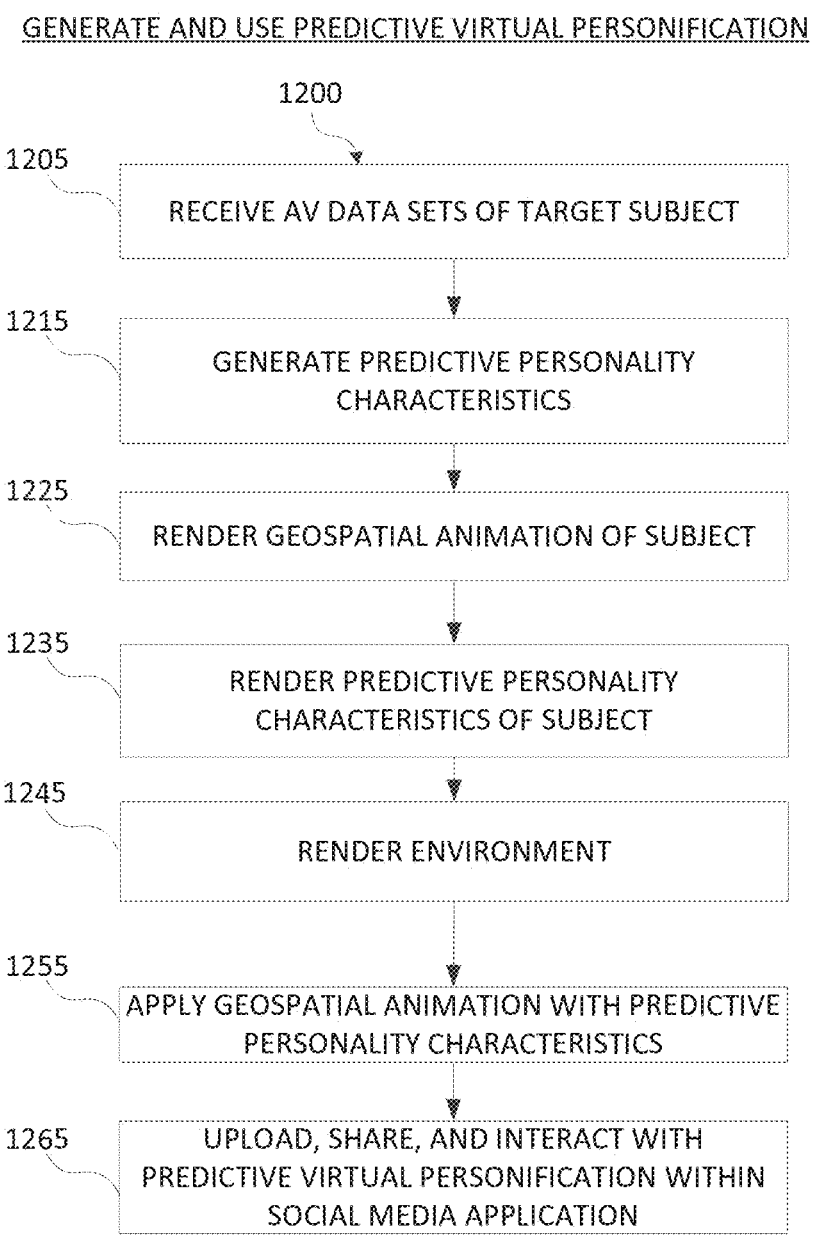
FIG. 12 illustrates a method for generating and using a predictive virtual personification, consistent with embodiments disclosed herein.

FIG. 12 is a diagram illustrating a method for generating and using a predictive virtual personification. The method includes receiving one or more audiovisual (AV) data sets of a donor subject at step 1205. For example, the AV data set could be real-time capture from any of the AV data sources described with respect to FIG. 6 above, as well as historical AV data sets. The AV data sets will be associated with a donor subject performing a specific task, or reacting to a stimulus event. The stimulus event may be an external stimulus event, such as it approaching baseball, it approaching automobile, and anticipated physical contact by another person, or any other external stimulus events disclosed herein, or that would be known to one of ordinary skill in the art. This is event may also be an internal stimulus event, such as a decision to perform a task. For example the task may be swing a golf club at a golf ball, or approaching a microphone to sing, or any other volitional task in which the subject might participate.

The method for generating and using a predictive virtual personification also includes generating a set of physio-emotional characteristics at step 1215. For example, the saliency server may generate the set of physio-emotional characteristics as one or more SROI specific saliency maps, consistent with the methods disclosed herein. The method for generating and using a virtual personification may also include rendering a geospatial animation of the subject at step 1225. For example, historical geospatial imaging of the donor subject taken from multiple perspectives may be compiled within PVP rendering engine 626. PVP rendering engine 626 may then use known CGI rendering methods to generate either a two-dimensional or three-dimensional animation of the donor subject. In some embodiments, the animation of the donor subject may be a realistic depiction of the donor subject. In other embodiments, the animation of the donor subject may be a cartoon of the donor subject, or an altered version of the donor subject.

The method for generating and using a predictive virtual personification may also include rendering physio-emotional characteristics of the subject at step 1235. For example, the physio-emotional characteristics associated with a donor subject may be stored in data store 630. These physio-emotional characteristics are correlated SROI specific saliency maps associated with various stimulus events. Data store 630 may also store a database organizing various stimulus events by label and type. In some embodiments, the saliency data collected from the donor subject may only relate to a subset of the available stimulus event types and/or labels known to the predictive virtual personification system. However, PVP rendering engine 626 may extrapolate the correlated SROI specific saliency maps generated from the AV data sets of the donor subject to create rendered SROI specific saliency maps that cover a complete set of probable stimulus events. For example, PVP rendering engine 626 may compare correlated SROI specific saliency maps for one donor subject in reaction to a subset of stimulus events to other subjects reaction to the same types of stimulus events to identify closely matching profiles, and differences within those profiles between the one donor subject and the other subjects. The PVP rendering engine may then use those differences to extrapolate to the one donor subject a complete set of rendered SROI specific saliency maps for stimulus event data collected from the other subjects. Accordingly, PVP rendering engine 626 may either recall, or calculate on-the-fly a set of rendered SROI specific saliency maps approximating how a donor subject would react to any of the stimulus events and/or stimulus event types known to the predictive virtual personification system.

In some embodiments, more than one set of correlated SROI specific saliency maps will be captured and stored for a specific stimulus event. Thus, a donor subject may react differently, with some slight variances to a specific stimulus event. The rendering of the physio-emotional characteristics may also include applying a Bayesian probability function to determine which set of correlated SROI specific saliency maps to apply in response to a specific stimulus event, in light of the historic response pattern a donor subject may have had to similar stimulus events.

Rendering the physio-emotional characteristics of the subject at 1235 may also include adapting correlated and/or rendered SROI specific saliency maps using a CPF function. For example, as a donor subject is repeatedly exposed to the same stimulus event, the donor subject's natural reaction to estimates of may change. For example, the speed of any reaction to the stimulus event may increase such that a pattern linking any preprocessing and/or preplanning by the donor subject in relation to the donor subject active response to the stimulus event may become more predictable, more repeatable, and faster, following a CPF function. Thus, the CPF function may be applied to the rendered or correlated SROI specific saliency maps, increasing the probability that any given map may be applied in response to a specific stimulus event, in fact altering that map by shortening the time between stimulus event and active response.

The method for generating and using a predictive virtual personification may also include rendering environment at step 1245. For example, the environment may be any setting applicable to the donor subject. For example, the environment could be a baseball field, a golf tee box, a stage of the music concert, a couch in the living room, or any other place that a person might find himself or herself. Environment rendering engine 628 may use known CGI methods to render the environment based on historical AV data of similar environment stored in data store 630. Alternatively, in some embodiments, environment rendering engine 628 writers environment based on real-time AV data sets being captured through AV source 610 such that a real-time environment may be provided to the predictive virtual personification.

The method for generating and using a predictive virtual personification may also include applying the geospatial animation of the donor subject with the physio-emotional characteristics at step 1255. For example, the predictive virtual personification may be rendered within the rendered environment and exposed to one or more stimulus events. As saliency recognition engine recognizes the stimulus events, or the stimulus events are either pre-populated or populated in real time into the PVP server through the user interface, the PVP rendering engine can predict how the donor subject would have reacted to the stimulus event, and may apply a set of rendered SROI specific saliency maps to animate the predictive virtual personification within the rendered environment. In cases where the rendered environment is drawn in real time from a real environment, the predictive virtual personification may be projected into the real environment through AV output device 640. In cases where the rendered environment is generated from historical or animated data sets, both the rendered environment and predictive virtual personification may be output through AV output device 640.

In some embodiments, social media users may share data, including personalized CPF data and/or predictive virtual personification data, using one or more social media applications. For example, a social media user may use a the cognitive and geospatial signal analysis devices disclosed herein to capture a CPF for a particular task and upload that CPF to the user's profile page within a social media application, and may modify the CPF if changes occur over time. Similarly, other users may capture their own CPF data for performing the same task. A group may be formed within the social media application enabling users to share their CPFs, share CPF data, and use other user's CPF data as a benchmark to enhance a training regimen. In one example, users may compete to learn how to play golf, using a normalized CPF as an indicator of how well each user has learned. One of skill in the art would appreciate that social media users may compete in a wide variety of learning regimens covering any type of activity.

In some embodiments, social media users may capture AV data using a mobile capture device, including a mobile phone camera and audio recorder. The data may be uploaded through a network, such as the Internet, to a PVP server for analysis. The user may provide additional input to label SROI's and event maps, and selecting particular stimulus events. The PVP server may then use the user input and AV data to compile correlated SROI specific saliency maps, consistent with embodiments disclosed herein. The PVP server may also use the AV data and correlated SROI specific saliency maps to render a predictive virtual personification of the user, and the predictive virtual personification may be stored within a user's profile page within a social media application. In some examples, the predictive virtual personification may interact with other users or other predictive virtual personifications within one or more social media site by sending and responding to messages, posts, and blogs. Embodiments disclosed herein enable users to share CPF and predictive virtual personification data to social media applications, such as FACEBOOK, INSTAGRAM, TWITTER, YOUTUBE, LINKED IN, and social media sites configured to enable the management of AV content. Users may configure their CPF and/or predictive virtual personification data to automatically display through social media applications, or any other web interface, for example, using HTTP, HTTPS, or other communications protocols, or using available Application Program Interfaces (API). Users may search, subscribe, view, and manage their data channels, and modify their associated metadata content from anywhere for rebroadcasting to anywhere.

In some embodiments, a user may store a predictive virtual personification on a social media site and share access to the predictive virtual personification with a selected group of other users. Members of the group may have access not only to interact with the predictive virtual personification via the social media application, but also to talk to or virtually interact with the rendered predictive virtual personification through video chat tools, for example, tools embedded within a mobile wireless device such as FACETIME, SKYPE, or other similar tools. In one example, a receiving side device may include a video projector, a holographic projector, or an AV reality device such as a virtual reality headset, to display the predictive virtual personification and allow members of the group to interact with the predictive virtual personification.

In some embodiments, CPF and/or other predictive virtual personification data from a group or network of users may be compiled and correlated with respect to user demographic traits (e.g., gender, race, age, geography, religion, etc.) as related to personality, behavior, and learning traits. The data may be captured from social media feeds, consistent with embodiments disclosed herein, manually entered, or collected directly from one or more PVP servers. A central database may store these correlated data sets for analysis by sociologists, psychologists, or other users interested in understanding demographic and environmental effects on human behavior.

Figure 13:
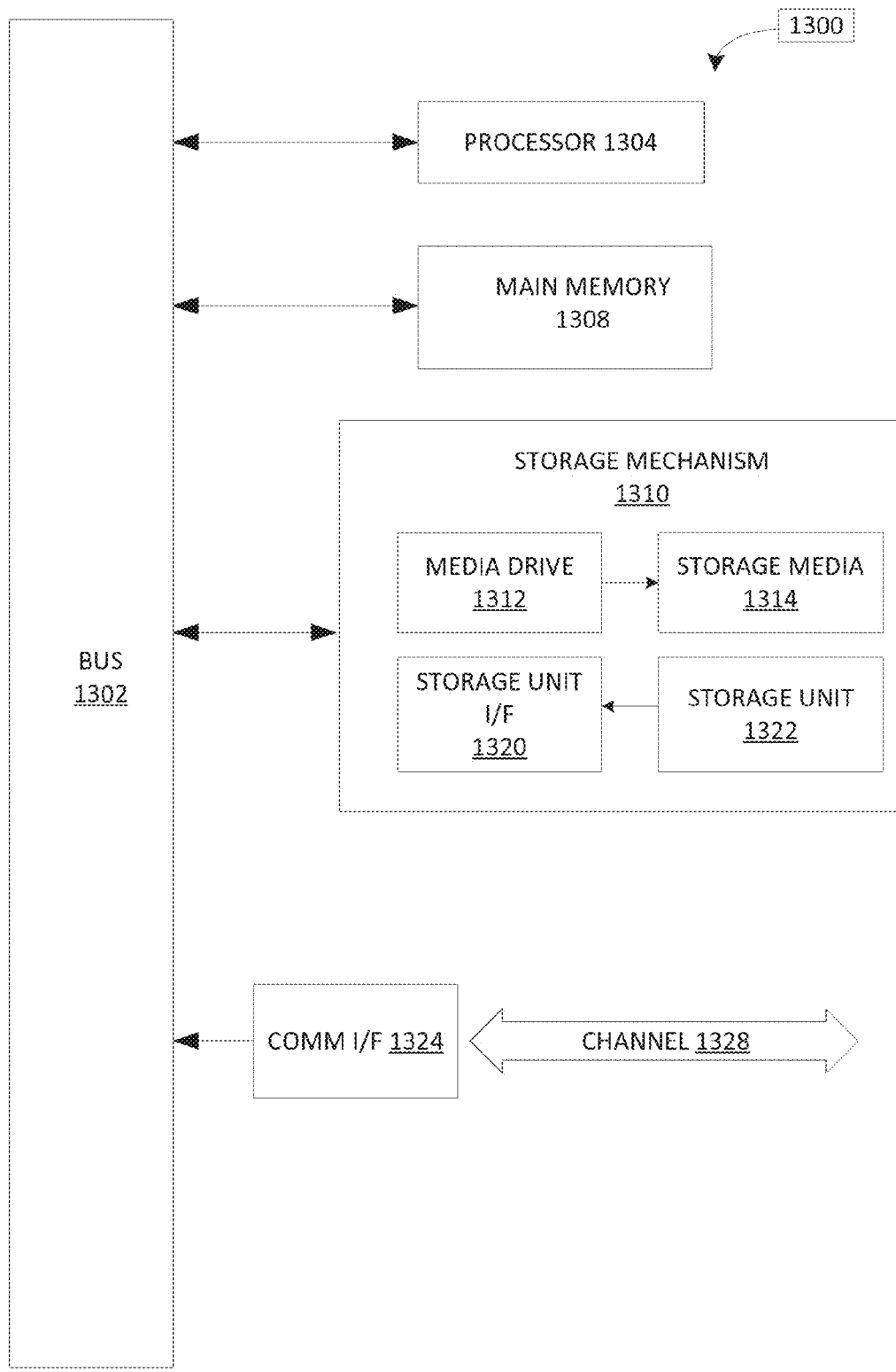
FIG. 13 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example-computing module 1300. After reading this description, it will become apparent to a person skilled in the relevant art how to implement the technology using other computing modules or architectures.

Referring now to FIG. 13, computing module 1300 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1300 might include, for example, one or more processors, controllers, control modules, or other processing devices, such as a processor 1304. Processor 1304 might be implemented using a general-purpose or special-purpose processing engine such as, for example, a microprocessor, controller, or other control logic. In the illustrated example, processor 1304 is connected to a bus 1302, although any communication medium can be used to facilitate interaction with other components of computing module 1300 or to communicate externally.

Computing module 1300 might also include one or more memory modules, simply referred to herein as main memory 1308. For example, preferably random access memory (RAM) or other dynamic memory, might be used for storing information and instructions to be executed by processor 1304. Main memory 1308 might also be used for storing temporary variables or other intermediate information during execution of instructions to be executed by processor 1304. Computing module 1300 might likewise include a read only memory ("ROM") or other static storage device coupled to bus 1302 for storing static information and instructions for processor 1304.

The computing module 1300 might also include one or more various forms of information storage mechanism 1310, which might include, for example, a media drive 1312 and a storage unit interface 1320. The media drive 1312 might include a drive or other mechanism to support fixed or removable storage media 1314. For example, a hard disk drive, a floppy disk drive, a magnetic tape drive, an optical disk drive, a CD or DVD drive (R or RW), or other removable or fixed media drive might be provided. Accordingly, storage media 1314 might include, for example, a hard disk, a floppy disk, magnetic tape, cartridge, optical disk, a CD or DVD, or other fixed or removable medium that is read by, written to or accessed by media drive 1312. As these examples illustrate, the storage media 1314 can include a computer usable storage medium having stored therein computer software or data.

In alternative embodiments, information storage mechanism 1310 might include other similar instrumentalities for allowing computer programs or other instructions or data to be loaded into computing module 1300. Such instrumentalities might include, for example, a fixed or removable storage unit 1322 and an interface 1320. Examples of such storage units 1322 and interfaces 1320 can include a program cartridge and cartridge interface, a removable memory (for example, a flash memory or other removable memory module) and memory slot, a PCMCIA slot and card, and other fixed or removable storage units 1322 and interfaces 1320 that allow software and data to be transferred from the storage unit 1322 to computing module 1300.

Computing module 1300 might also include a communications interface 1324. Communications interface 1324 might be used to allow software and data to be transferred between computing module 1300 and external devices. Examples of communications interface 1324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1324 might typically be carried on signals, which can be electronic, electromagnetic (which includes optical) or other signals capable of being exchanged by a given communications interface 1324. These signals might be provided to communications interface 1324 via a channel 1328. This channel 1328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1308, storage unit 1320, media 1314, and channel 1328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1300 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for generating a predictive virtual personification comprises:
  receiving, from an AV data source, one or more AV data sets;
  locating within each AV data set, with a saliency recognition engine, a graphical representation of a donor subject and a set of saliency regions of interest (SROI) within said graphical representation of the donor subject;
  identifying one or more trigger stimulus events, wherein each trigger stimulus events precedes or is contemporaneous with one or more SROI specific reactive responses and each SROI specific reactive response is observable within a SROI;
  identifying a set of donor-specific physio-emotional characteristics corresponding to a donor-specific physio-emotional state at the time of the trigger stimulus event and tagging the set of correlated SROI specific saliency maps with the corresponding set of donor-specific physio-emotional characteristics;
  generating, for each SROI, a set of SROI specific saliency maps, wherein each SROI specific saliency map plots a change in geospatial orientation of one or more SROIs within a predetermined time-frame corresponding to each trigger stimulus event; and
  storing, in a data store, a set of correlated SROI specific saliency maps generated by correlating each SROI specific saliency map a corresponding trigger event.

2. The method of claim 1, wherein the identifying a set of donor-specific physio-emotional characteristics comprises manually entering, with a user input device, one or more physio-emotional characteristic tags corresponding to a known physio-emotional state of the donor subject.

3. The method of claim 1, wherein the identifying a set of donor-specific physio-emotional characteristics comprises matching, with a predictive virtual presentation (PVP) correlation engine, one or more correlated SROI specific saliency maps with a plurality of historical SROI specific saliency maps, wherein each historical SROI specific saliency map corresponds to a set of physio-emotional characteristics.

4. The method of claim 3, wherein the matching the one or more correlated SROI specific saliency maps with a plurality of historical SROI specific saliency maps comprises applying, with the PVP correlation engine, a renormalization group transformation to each historical specific saliency map to generate a predictive saliency map space.

5. The method of claim 1, wherein the set of donor-specific physio-emotional characteristics comprises mood, level of rest, level of stress, or health.

6. The method of claim 1, further comprising generating, with a graphical rendering engine, an animated representation of the donor subject using the AV data set.

7. The method of claim 6, further comprising exposing the animated representation of the donor subject to a secondary stimulus event and rendering for each SROI, with a PVP rendering engine, a predicted reactive response.

8. The method of claim 7, wherein the rendering a predicted reactive response comprises identifying a secondary set of physio-emotional characteristics corresponding to the animated representation of the donor subject;
  identifying one or more trigger stimulus events corresponding to the secondary stimulus event;
  receiving, from the data store, each set of correlated SROI specific saliency maps corresponding to each identified trigger stimulus event and to the identified set of physio-emotional characteristics; and
  generating, with the PVP rendering engine, a set of predictive SROI-specific saliency maps based on a probabilistic extrapolation as a function of the correlated SROI specific saliency maps, the identified physio-emotional characteristics, and the identified trigger stimulus event.

9. The method of claim 8, wherein the generating a set of predictive SROI-specific saliency maps comprises collecting the correlated SROI specific saliency maps into a historical saliency map space and applying a renormalization group transformation to the historical saliency map space to generate a predictive saliency map space.

10. The method of claim 8, further comprising rendering, with the graphical rendering engine, a geospatial movement of the animated representation of the donor subject by applying the set of predictive SROI-specific saliency maps to each SROI within the animated representation of the donor subject.

11. A system for generating a predictive virtual personification comprises:
an AV data source, a data store, and a saliency recognition engine;
wherein the AV data source is configured to transmit one or more AV data sets to the saliency recognition engine, each AV data set comprising a graphical representation of a donor subject; and
the saliency recognition engine comprises a non-volatile computer readable media with a computer program stored thereon, the computer program configured to receive the AV data set and one or more identified trigger stimulus events, wherein each identified trigger stimulus events precedes or is contemporaneous with one or more saliency regions of interest (SROI) specific reactive responses and each SROI specific reactive response is observable within an SROI;
locate a set of SROI within the graphical representation of the donor subject;
generate, for each SROI, a set of SROI specific saliency maps, wherein each SROI specific saliency map plots a change in geospatial orientation of one or more SROIs within a predetermined time-frame corresponding to each trigger stimulus event;
identify a set of donor-specific physio-emotional characteristics corresponding to a donor-specific physio-emotional state at the time of the trigger stimulus event and tagging the set of correlated SROI specific saliency maps with the corresponding set of donor-specific physio-emotional characteristics; and
store, in the data store, a set of correlated SROI specific saliency maps generated by correlating each SROI specific saliency map a corresponding trigger event.

12. The system of claim 11, wherein the AV data source is a historical archive comprising subsequently captured film, video, or audio data.

13. The system of claim 11, wherein the AV data source is a video camera, a television camera, a high frame rate video camera, a high resolution video camera, a motion capture device (MOCAP), or a functional imaging modality.

14. The system of claim 11, wherein the saliency recognition engine is further configured to identify a set of donor-specific physio-emotional characteristics corresponding to a donor-specific physio-emotional state at the time of the trigger stimulus event and tag the set of correlated SROI specific saliency maps with the corresponding set of donor-specific physio-emotional characteristics.

15. The system of claim 14, further comprising a graphical rendering engine configured to generate an animated representation of the donor subject based on the AV data set.

16. The system of claim 15, further comprising a predictive virtual presentation (PVP) rendering engine configured to generate a predicted reactive response to a secondary stimulus event.

17. The system of claim 16, wherein the PVP rendering engine is further configured to:
identify a secondary set of physio-emotional characteristics corresponding to the animated representation of the donor subject;
identify one or more trigger stimulus events corresponding to the secondary stimulus event;
receive, from the data store, each set of correlated SROI specific saliency maps that correspond to each identified trigger stimulus event and to the identified set of physio-emotional characteristics; and
generate a set of predictive SROI-specific saliency maps based on a probabilistic extrapolation as a function of the correlated SROI specific saliency maps, the identified physio-emotional characteristics, and the identified trigger stimulus event.

18. The system of claim 17, wherein the graphical rendering engine is further configured to render geospatial movement of the animated representation of the donor subject by applying the set of predictive SROI-specific saliency maps to each SROI within the animated representation of the donor subject.

19. The system of claim 18, further comprising an AV output device configured to project the animated representation of the donor subject into a geospatial environment.

* * * * *